United States Patent
Feller

(10) Patent No.: US 9,462,105 B2
(45) Date of Patent: Oct. 4, 2016

(54) SYSTEMS AND METHODS FOR MANAGING INCOMING PHONE CALLS

(71) Applicant: Jedediah Michael Feller, Las Vegas, NV (US)

(72) Inventor: Jedediah Michael Feller, Las Vegas, NV (US)

(*) Notice: Subject to any disclaimer, the term of this patent is extended or adjusted under 35 U.S.C. 154(b) by 0 days.

(21) Appl. No.: 14/725,940

(22) Filed: May 29, 2015

(65) Prior Publication Data

US 2015/0350399 A1   Dec. 3, 2015

Related U.S. Application Data

(60) Provisional application No. 62/004,493, filed on May 29, 2014.

(51) Int. Cl.
| | |
|---|---|
| *H04M 3/42* | (2006.01) |
| *H04M 1/665* | (2006.01) |
| *H04M 1/57* | (2006.01) |
| *H04M 1/663* | (2006.01) |
| *H04M 1/725* | (2006.01) |
| *H04M 1/64* | (2006.01) |

(52) U.S. Cl.
CPC ............ *H04M 1/665* (2013.01); *H04M 1/57* (2013.01); *H04M 1/663* (2013.01); *H04M 1/72563* (2013.01); *H04M 1/64* (2013.01)

(58) Field of Classification Search
CPC .......................... H04M 1/665; H04M 1/0202
USPC ........................................................ 455/414
See application file for complete search history.

(56) References Cited

U.S. PATENT DOCUMENTS

| | | | |
|---|---|---|---|
| 6,023,503 A | 2/2000 | Schneider et al. | |
| 8,094,800 B1 | 1/2012 | Smith et al. | |
| 8,160,226 B2 | 4/2012 | Wood et al. | |
| 8,472,604 B2 | 6/2013 | Brahm et al. | |
| 8,661,142 B2 | 2/2014 | Scott et al. | |
| 8,933,983 B2 | 1/2015 | Vitale et al. | |
| 2006/0041622 A1 | 2/2006 | Qutub et al. | |
| 2009/0052647 A1 | 2/2009 | Wood et al. | |
| 2012/0015639 A1* | 1/2012 | Trivi | H04M 3/436 455/415 |
| 2012/0155628 A1* | 6/2012 | Booth | H04M 15/8044 379/221.05 |

FOREIGN PATENT DOCUMENTS

EP        676884        10/1995

* cited by examiner

*Primary Examiner* — Tanmay Shah
(74) *Attorney, Agent, or Firm* — Armstrong Teasdale LLP

(57) ABSTRACT

A method and system for managing incoming phone calls to a user device using a computer device coupled to a database are provided. The method includes storing in a memory, a plurality of category rules, the category rules associated with parameters of a phone call incoming to a user device, receiving an incoming phone call, comparing parameters of the incoming phone call with at least some of the category rules, assigning each incoming phone call to a category associated with one of the plurality category rules based on the comparison, and automatically, responding to the phone call based on an action specified by the category rules of the assigned category.

17 Claims, 25 Drawing Sheets

SYSTEMS AND METHODS FOR MANAGING INCOMING PHONE CALLS

CROSS REFERENCE TO RELATED APPLICATIONS

This application claims priority to and the benefit of the filing date of U.S. Provisional Application No. 62/004,493 filed on May 29, 2014, which is hereby incorporated by reference in its entirety.

BACKGROUND

This disclosure relates generally to managing communications between user devices and, more particularly, to communication systems and computer-based methods for managing incoming phone calls to a user device.

Users of portable communication devices, such as smart phones and wireless phones typically receive many calls per day at times when, although convenient for the caller, it is not convenient for the user. Also many phones calls originate with spammers and commercial entities where it may never be convenient for the user to accept those calls. Typically, users have been manually screening their phone calls using a caller ID associated with each call to avoid the inconvenience of answering the call. The user then has to remember to return the call when it is convenient and desirable to do so. In the meantime, the caller is left not knowing if the user has received the call or if the caller can expect a return call in a reasonable time-frame.

BRIEF DESCRIPTION

In one embodiment, a method for managing incoming phone calls to a user device includes storing in a memory, a plurality of category rules, the category rules associated with parameters of a phone call incoming to a user device, receiving an incoming phone call, comparing parameters of the incoming phone call with at least some of the category rules, assigning each incoming phone call to a category associated with one of the plurality category rules based on the comparison, and automatically, responding to the phone call based on an action specified by the category rules of the assigned category.

In another embodiment, a computer system includes a memory device and a processor in communication with the memory device wherein the computer system is programmed to receive a plurality of phone numbers from a user device, store the phone numbers in the memory device, each phone number associated with at least one category rule comprising respective thresholds for one or more phone call parameters, receive one or more parameters associated with an incoming phone call in real-time, compare the received parameters to one or more phone call parameters of the category rule associated with the phone number of the incoming phone call, route the phone call in accordance with the comparison.

In yet another embodiment, one or more non-transitory computer-readable storage media has computer-executable instructions embodied thereon, wherein when executed by at least one processor, the computer-executable instructions cause the processor to store in a memory, a plurality of category rules, the category rules associated with parameters of a phone call incoming to a user device, receive an incoming phone call, compare parameters of the incoming phone call with at least some of the category rules, assign each incoming phone call to a category associated with one of the plurality category rules based on the comparison, and automatically, respond to the phone call based on an action specified by the category rules of the assigned category.

BRIEF DESCRIPTION OF THE DRAWINGS

FIG. 1 is a perspective view of a user device in accordance with an example embodiment of the present disclosure.

FIG. 2 is a perspective view of user device displaying a login screen capture 202.

FIG. 3 is a perspective view of user device displaying a first signup screen capture 302.

FIG. 4 is a perspective view of user device displaying a second signup screen capture 402.

FIG. 5 is a perspective view of user device displaying a third signup screen capture 502.

FIG. 6 is a perspective view of user device displaying a fourth signup screen capture 602.

FIG. 7 is a perspective view of user device displaying a home screen screen capture 702.

FIG. 8 is a perspective view of user device displaying a first setup screen capture 802.

FIG. 9 is a perspective view of user device displaying a home screen screen capture 902.

FIG. 10 is a perspective view of user device displaying a screen capture 1002 of a drilldown in a phone record selected in FIG. 9.

FIG. 11 is a perspective view of user device displaying a screen capture 1102 of a dialing component for calling a phone number through the call management service to avoid having the user's phone number from being captured and used for spam or other advertising purpose.

FIG. 12 is a perspective view of user device displaying a screen capture 1202 of a component for managing a new phone number.

FIG. 13 is a perspective view of user device displaying a screen capture 1302 of a component for adding categories for a new phone number.

FIG. 14 is a perspective view of user device displaying a screen capture 1402 of a component for adding a new custom category 1404 to the list of shared categories 1304 (shown in FIG. 13).

FIG. 15 is a perspective view of user device displaying a screen capture 1502 of a component for blocking and allowing phone numbers that includes a block tab 1504 and an allow tab 1506.

FIG. 16 is a perspective view of user device displaying a screen capture 1602 of an allowed phone number entry screen that is accessed by clicking on allow tab 1506 (shown in FIG. 15).

FIG. 17 is a perspective view of user device displaying a screen capture 1702 of a component for unallowing an already allowed phone number.

FIG. 18 is a perspective view of user device displaying a screen capture 1802 of a block phone number entry screen that is accessed by clicking on block tab 1504 (shown in FIG. 15).

FIG. 19 is a perspective view of user device displaying a screen capture 1902 of a component for unblocking an already blocked phone number.

FIG. 20 is a perspective view of user device displaying a screen capture of a component for managing announcement settings of the application for managing incoming phone calls to the user device.

FIG. 21 is a perspective view of a user device displaying a screen capture of a component for recording an announcement, for example, an allowed caller.

FIG. 22 illustrates an example configuration of a user device operated by a user.

FIG. 23 illustrates an example configuration of a server system in accordance with an example embodiment of the present disclosure.

DETAILED DESCRIPTION

Figure 1:
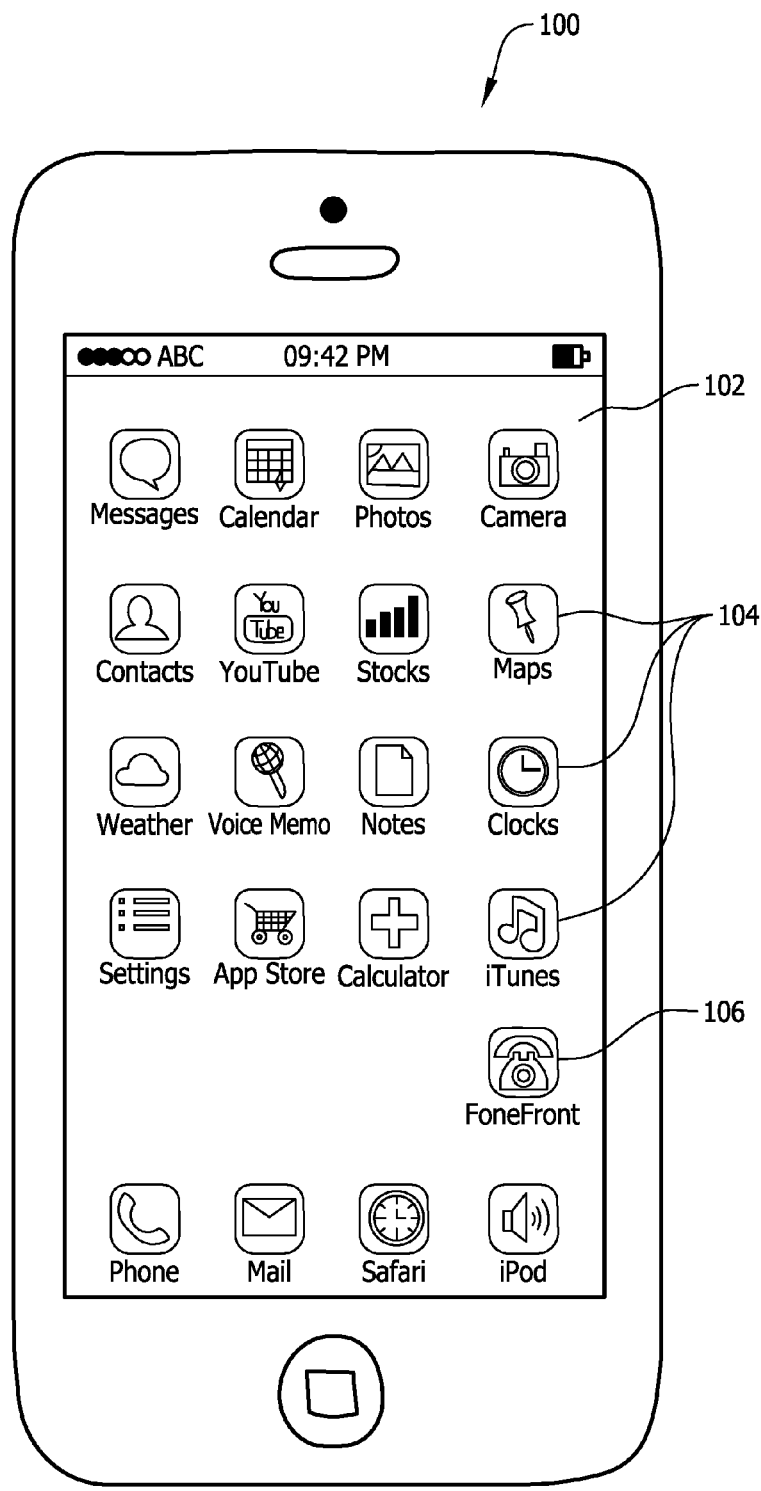
FIGS. 1-23 show example embodiments of the methods and systems described herein.

Embodiments of the methods and systems described herein relate to categorization and customization of handling incoming phone numbers on a user device, such as, but, not limited to, a smart phone. For example, calls from designated spam phone numbers (i.e., phone numbers listed in a spam category) are routed directly to a voice message component that responds to the phone call with a message that indicates that the called party does not accept commercial calls and the person calling can leave a voice message, which can be set up to only go to the user's (receiver's) email, or if the user allows the setting that any voicemail can be sent with a request to be considered for being removed from spam category.

Moreover, options for blocking incoming phone calls include:
1) Block completely,
   a) with option to request being removed from blocked (or upgraded to blocked with voice message capabilities).
2) Block with voice message,
   a) voice message left on server.
   b) sent only to users email.
   c) voice message sent with request to be removed from blocked (or upgraded to another category).
3) Block with text messaging,
   a) text sent with voice message link.
   b) text sent with call details.
4) Allow with greeting (you are FoneFront allowed please wait as you are transferred)
   a) voice message if not answered.

Moreover, users maintain many roles in their day-to-day life. Each role includes different people and organizations that might want access to the user at different times of the day. Some of these times may be convenient for the caller, but would be inconvenient to the user. Typically, incoming phone calls are identified by the callers caller ID, or the phone number from which the call originates. Once manually identified, the user can decide to answer the call of ignore it. However, even though the timing might be inconvenient for the caller to answer a call from a particular caller at a particular time, it is often desirable to provide the caller with an indication that the call was received and will be returned in due course. Embodiments of the present disclosure permit a user to segregate callers and call times into more convenient time frames using a single user device.

The methods and systems described herein may be implemented using computer programming or engineering techniques including computer software, firmware, hardware or any combination or subset thereof, the technical effect of the methods and systems may be achieved by performing at least one of the following steps: (a) storing in a memory, a plurality of category rules, the category rules associated with parameters of a phone call incoming to a user device, (b) receiving an incoming phone call, (c) comparing parameters of the incoming phone call with at least some of the category rules, (d) assigning each incoming phone call to a category associated with one of the plurality category rules based on the comparison, and (e) automatically, responding to the phone call based on an action specified by the category rules of the assigned category.

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a perspective view of a user device 100 in accordance with an example embodiment of the present disclosure. In the example embodiment, user device 100 includes a screen 102 upon which a plurality of icons 104 can be selectively displayed. One such icon 106 represents a means to access an application for managing incoming phone calls to user device 100.

Figure 2:
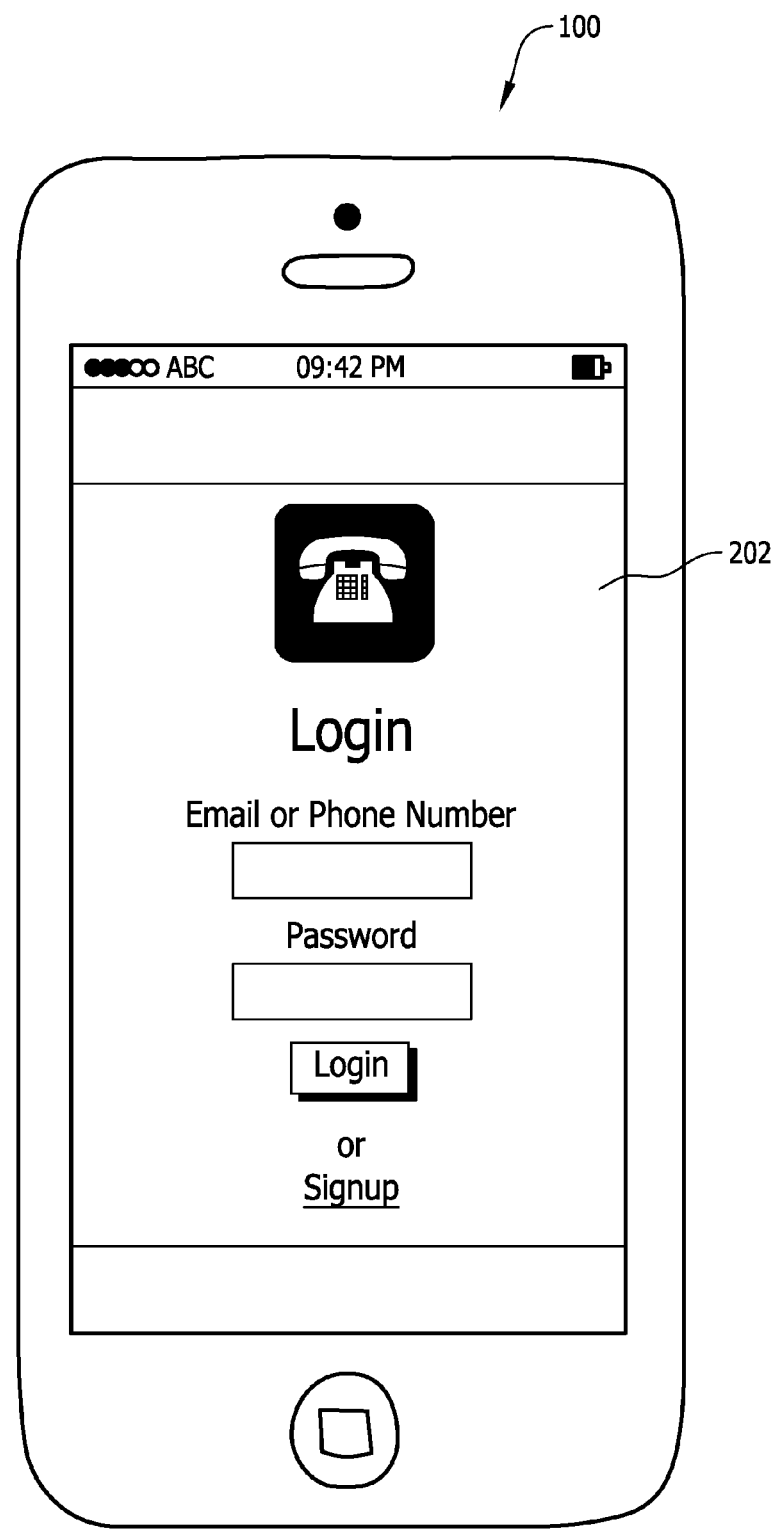

FIG. 2 is a perspective view of user device 100 displaying a login screen capture 202.

Figure 3:
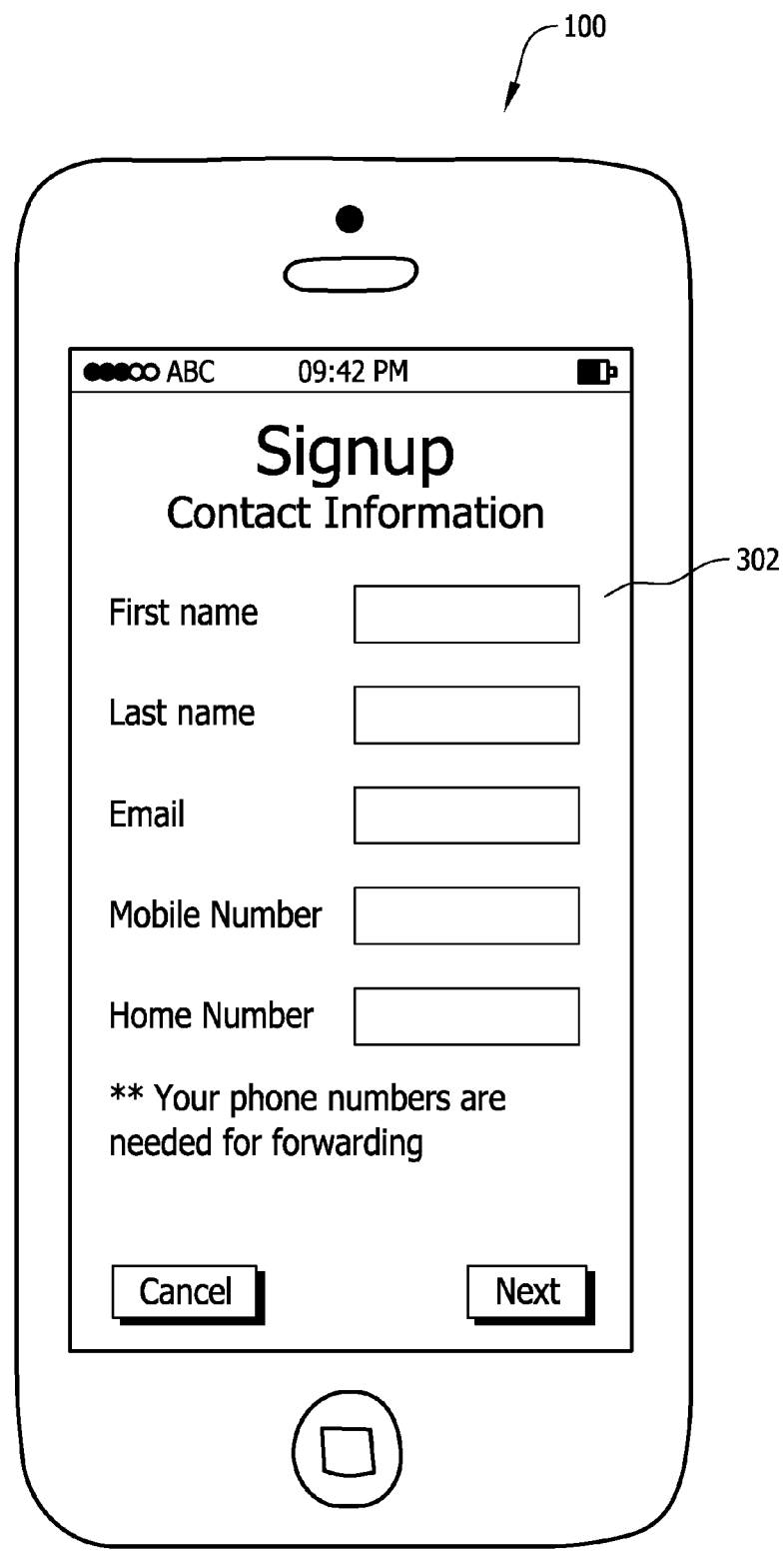

FIG. 3 is a perspective view of user device 100 displaying a first signup screen capture 302.

Figure 4:
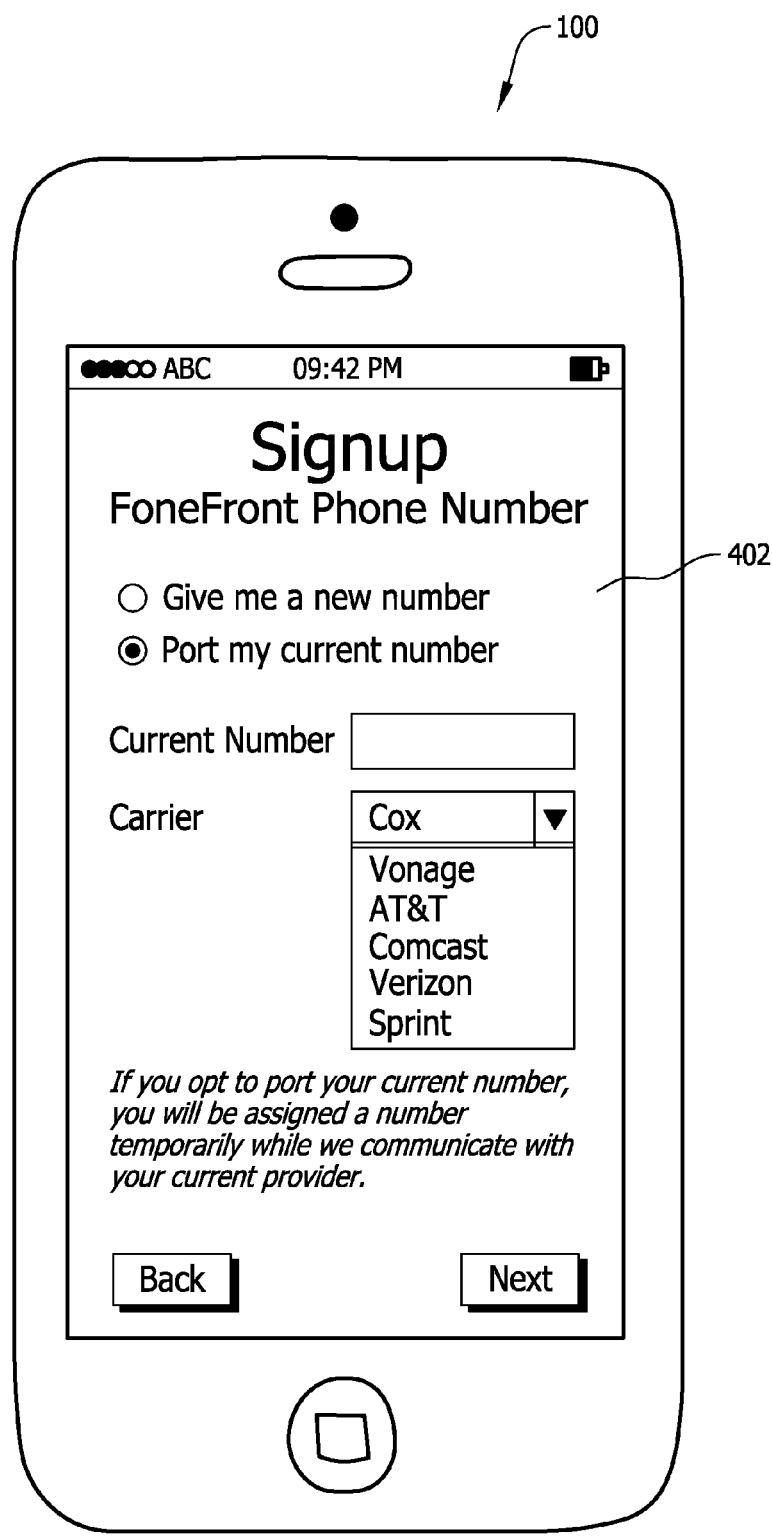

FIG. 4 is a perspective view of user device 100 displaying a second signup screen capture 402.

Figure 5:
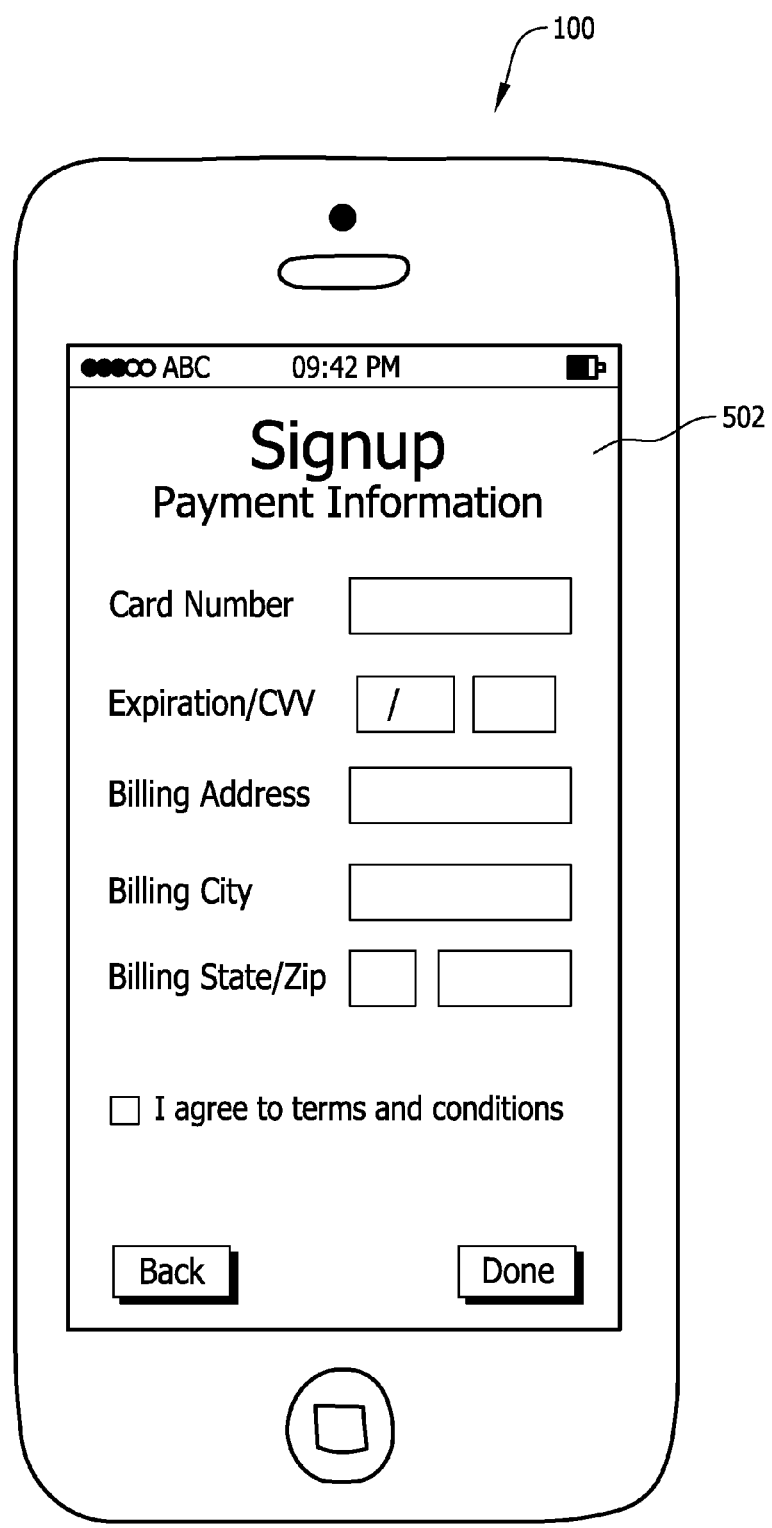

FIG. 5 is a perspective view of user device 100 displaying a third signup screen capture 502.

Figure 6:
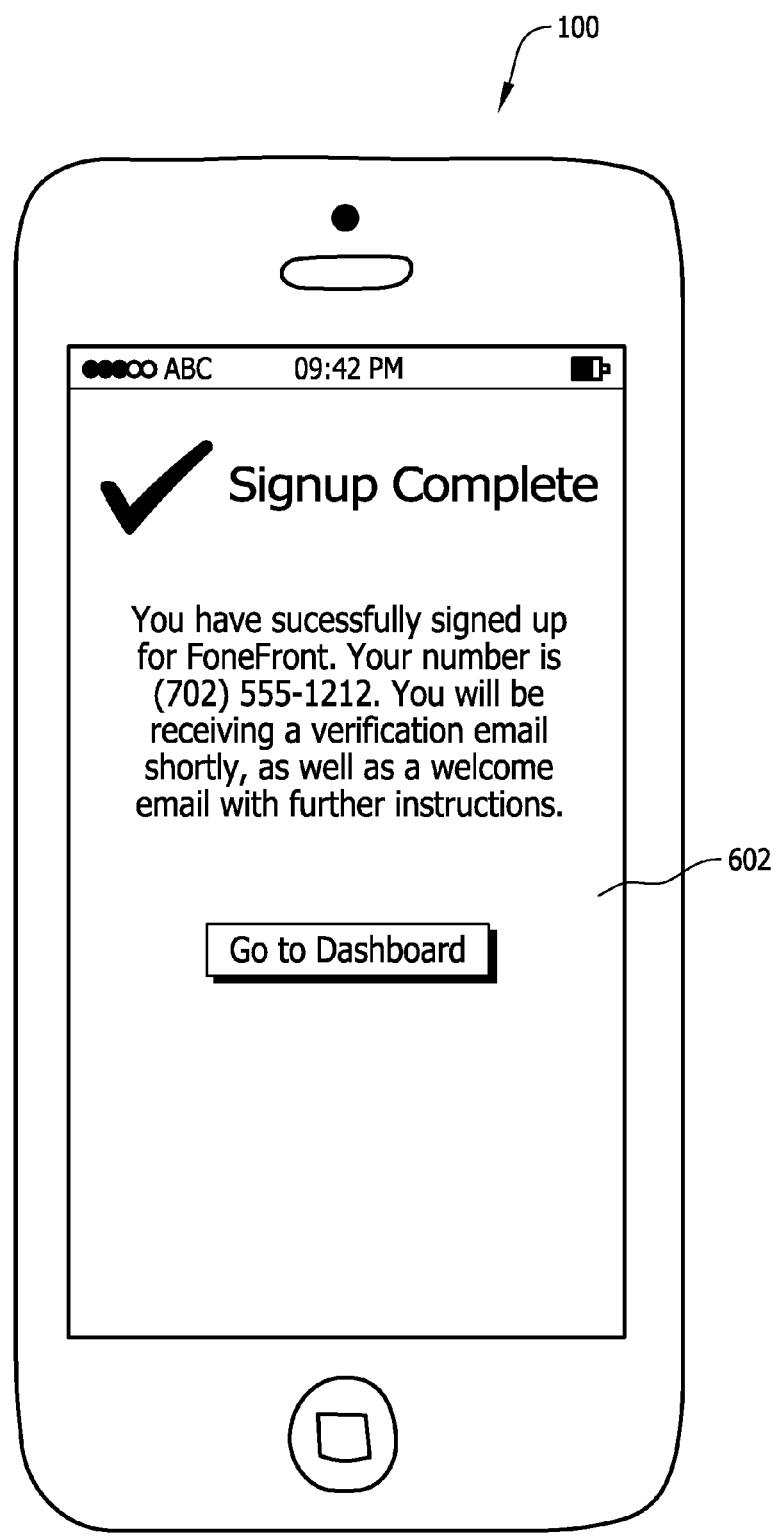

FIG. 6 is a perspective view of user device 100 displaying a fourth signup screen capture 602.

Figure 7:
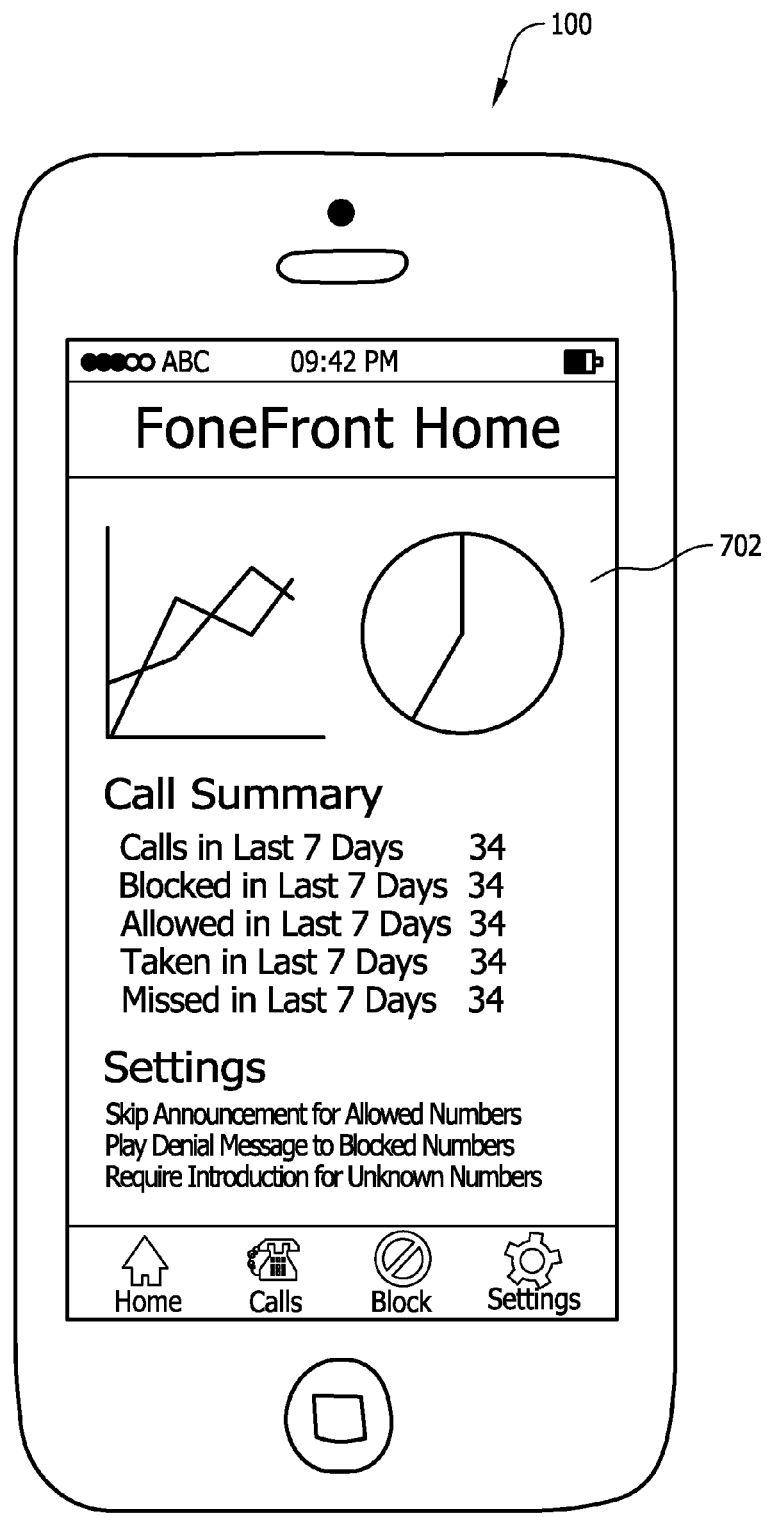

FIG. 7 is a perspective view of user device 100 displaying a home screen screen capture 702.

Figure 8:
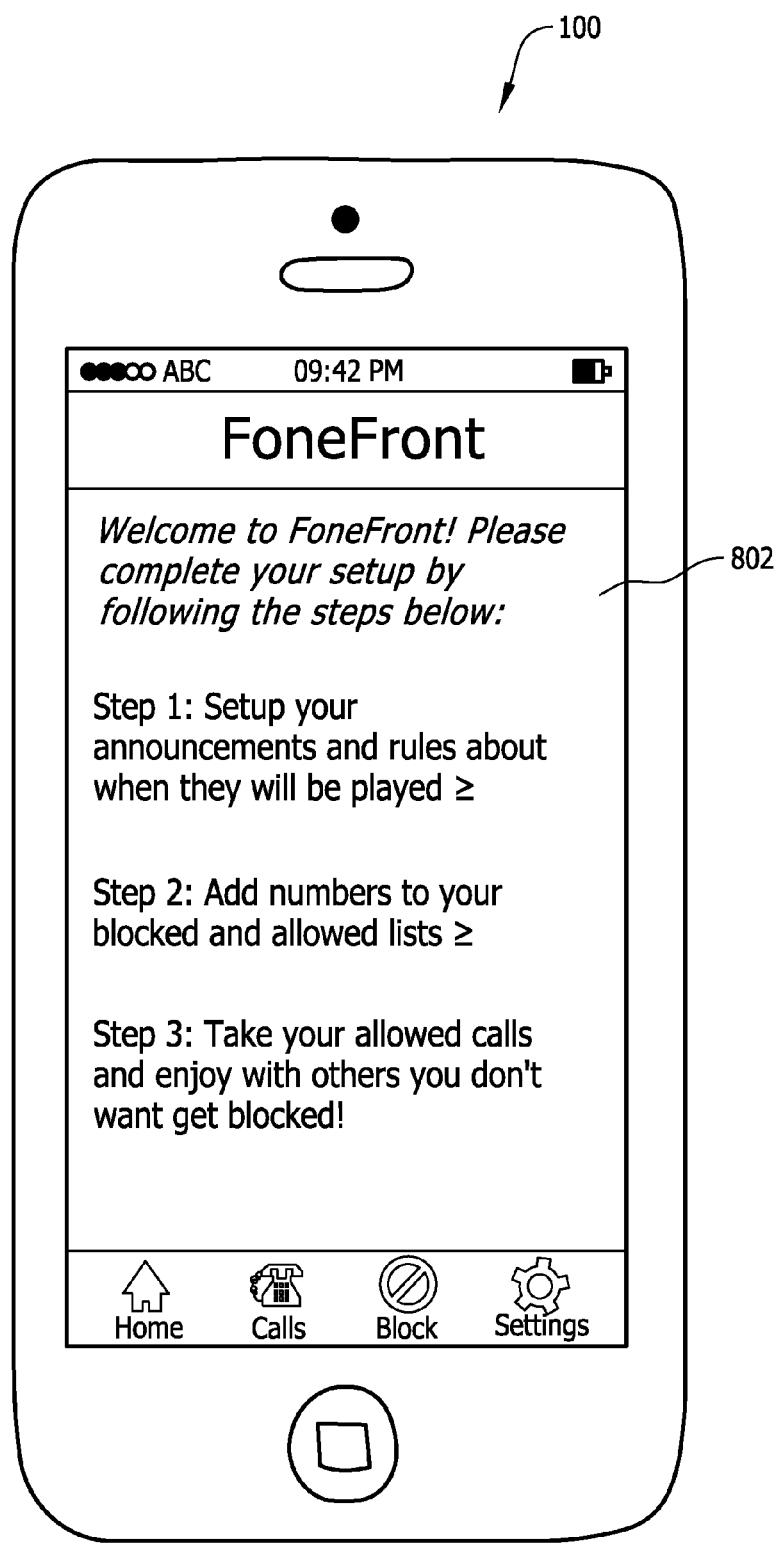

FIG. 8 is a perspective view of user device 100 displaying a first setup screen capture 802.

Figure 9:
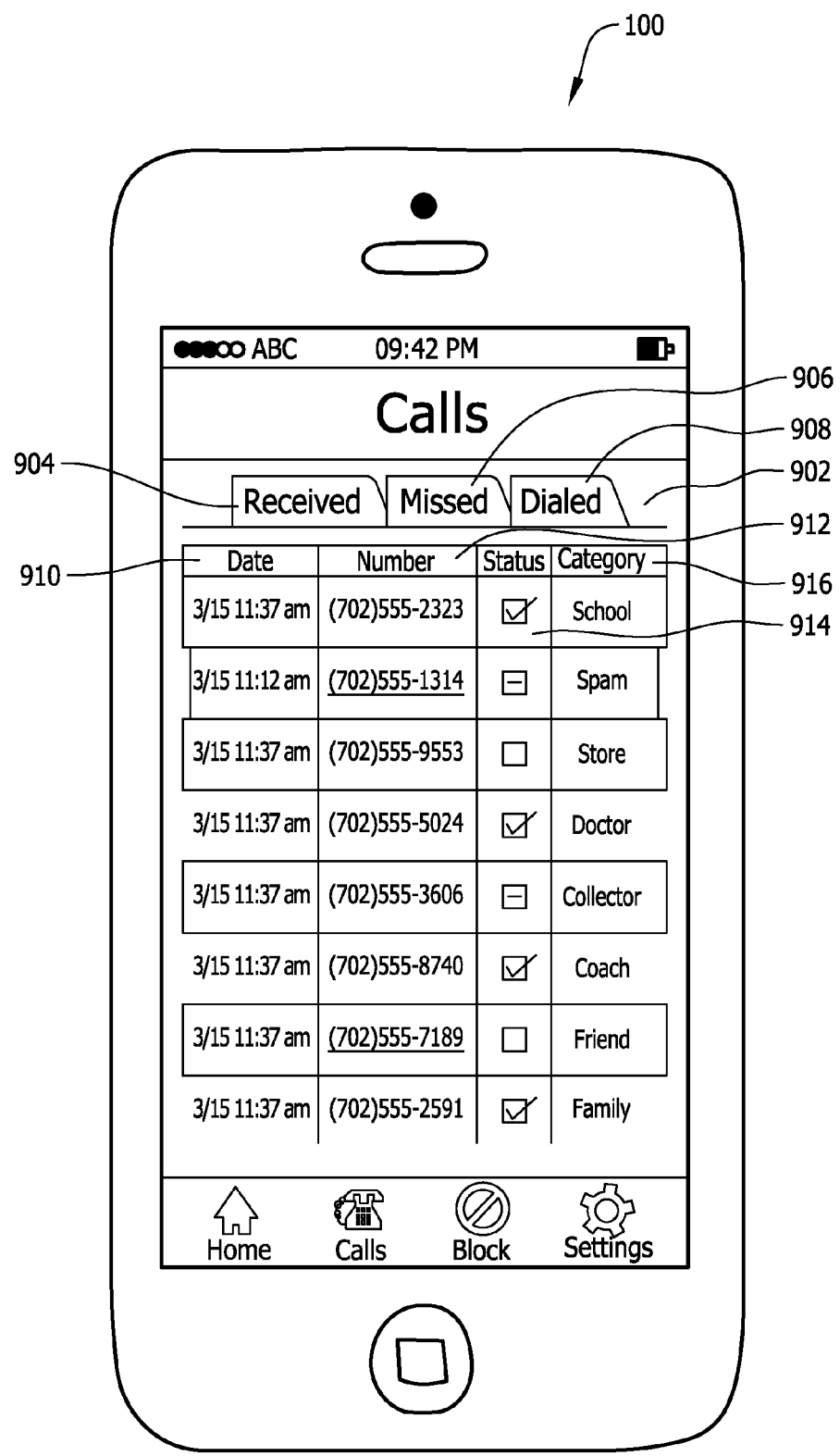

FIG. 9 is a perspective view of user device 100 displaying a home screen screen capture 902. In the example embodiment, screen capture 902 displays a call log of received calls 904, missed calls 906, and dialed calls 908. Additional classes of calls may be included in additional tabs. Each class selected includes at least a display of a time 910 the call was received or placed, a phone number 912 the call was received from or placed to, a status 914 of the call, and a category 916 into which the call was assigned.

Figure 10:
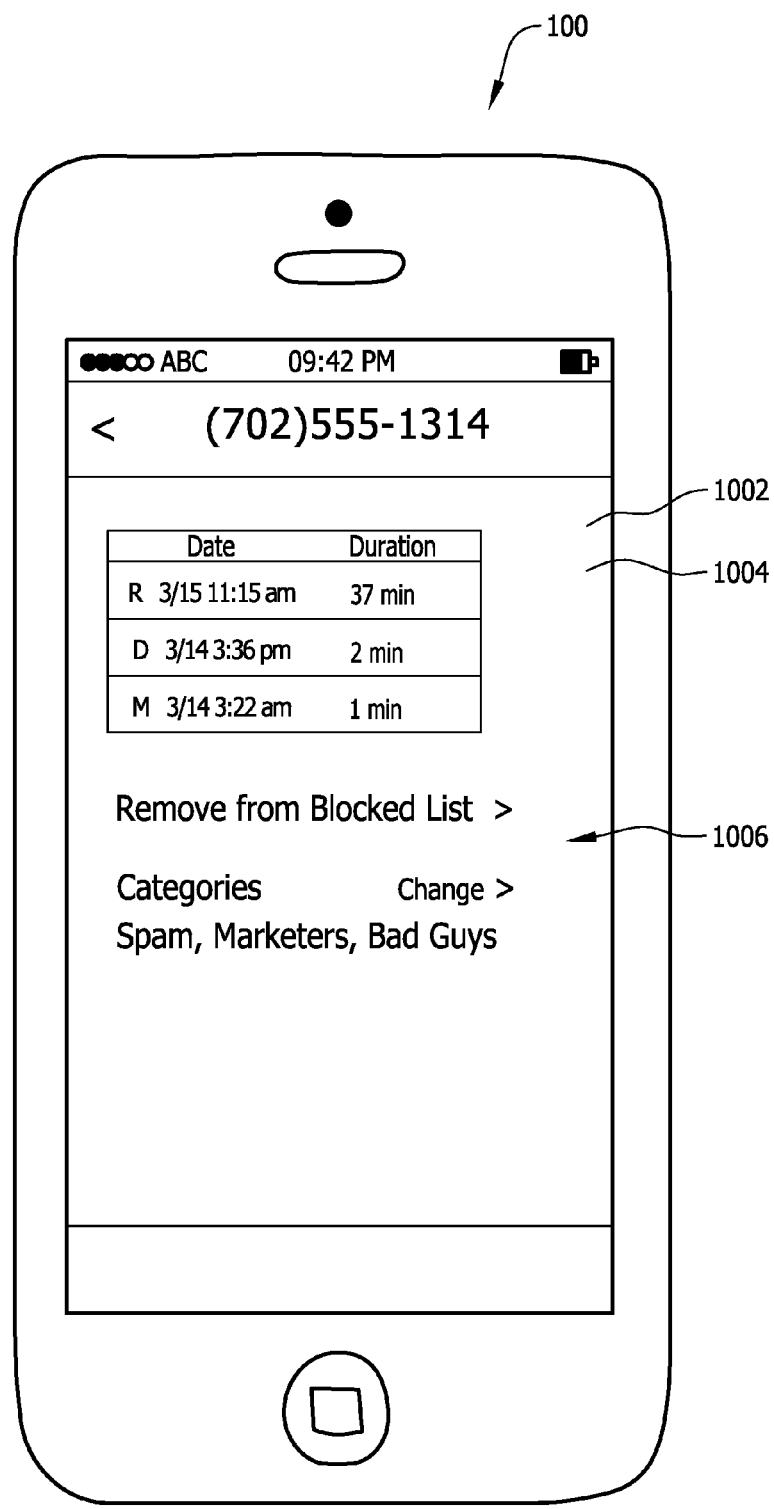

FIG. 10 is a perspective view of user device 100 displaying a screen capture 1002 of a drilldown in a phone record selected in FIG. 9. Screen capture 1002 includes detailed call information 1004 for the phone number selected and menu items 1006 for selection that permits removing the phone number from the blocked list, or adding the phone number to the blocked list, and changing a category assigned to the phone or adding or associating a new category to the phone number.

Figure 11:
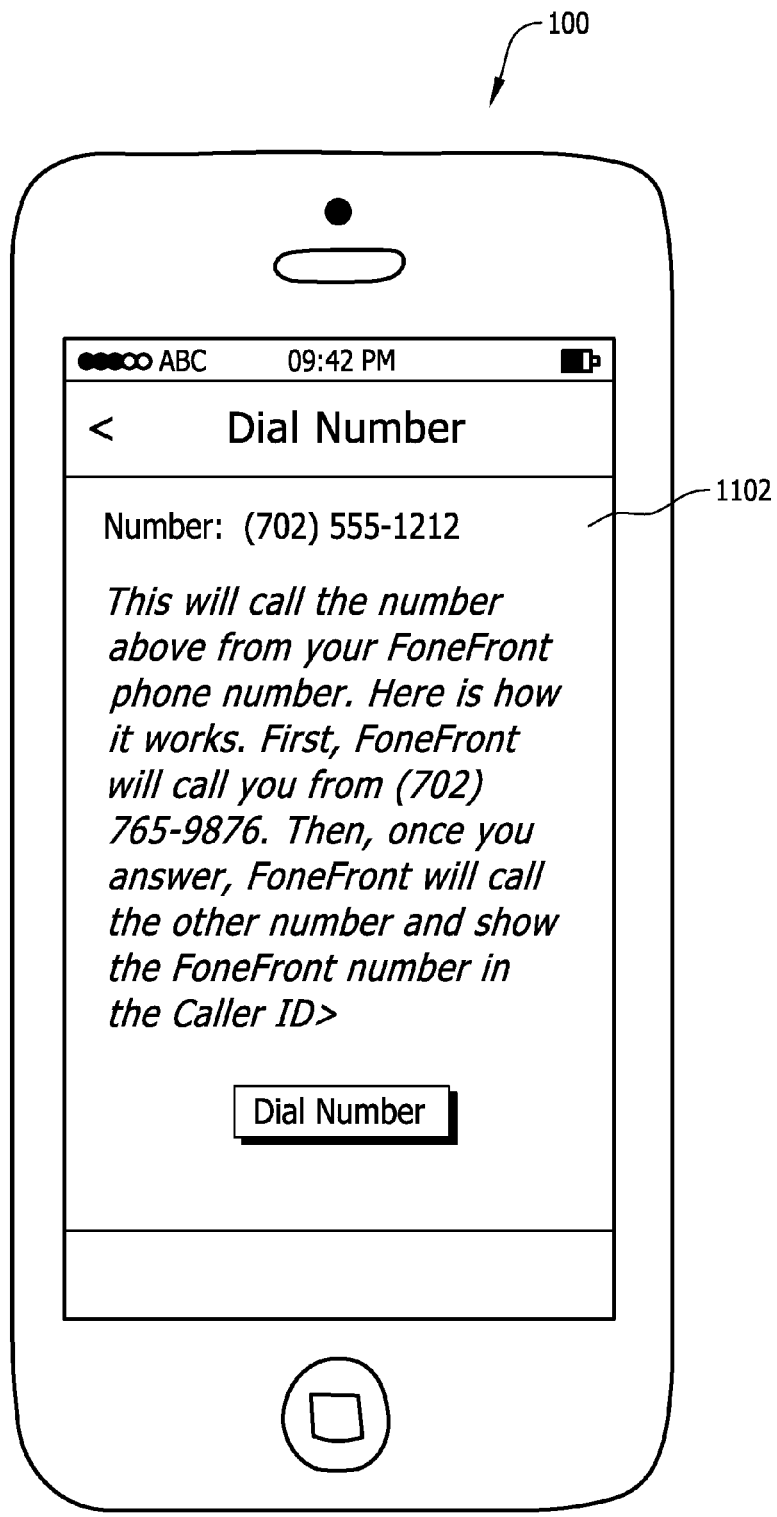

FIG. 11 is a perspective view of user device 100 displaying a screen capture 1102 of a dialing component for calling a phone number through the call management service to avoid having the user's phone number from being captured and used for spam or other advertising purpose.

Figure 12:
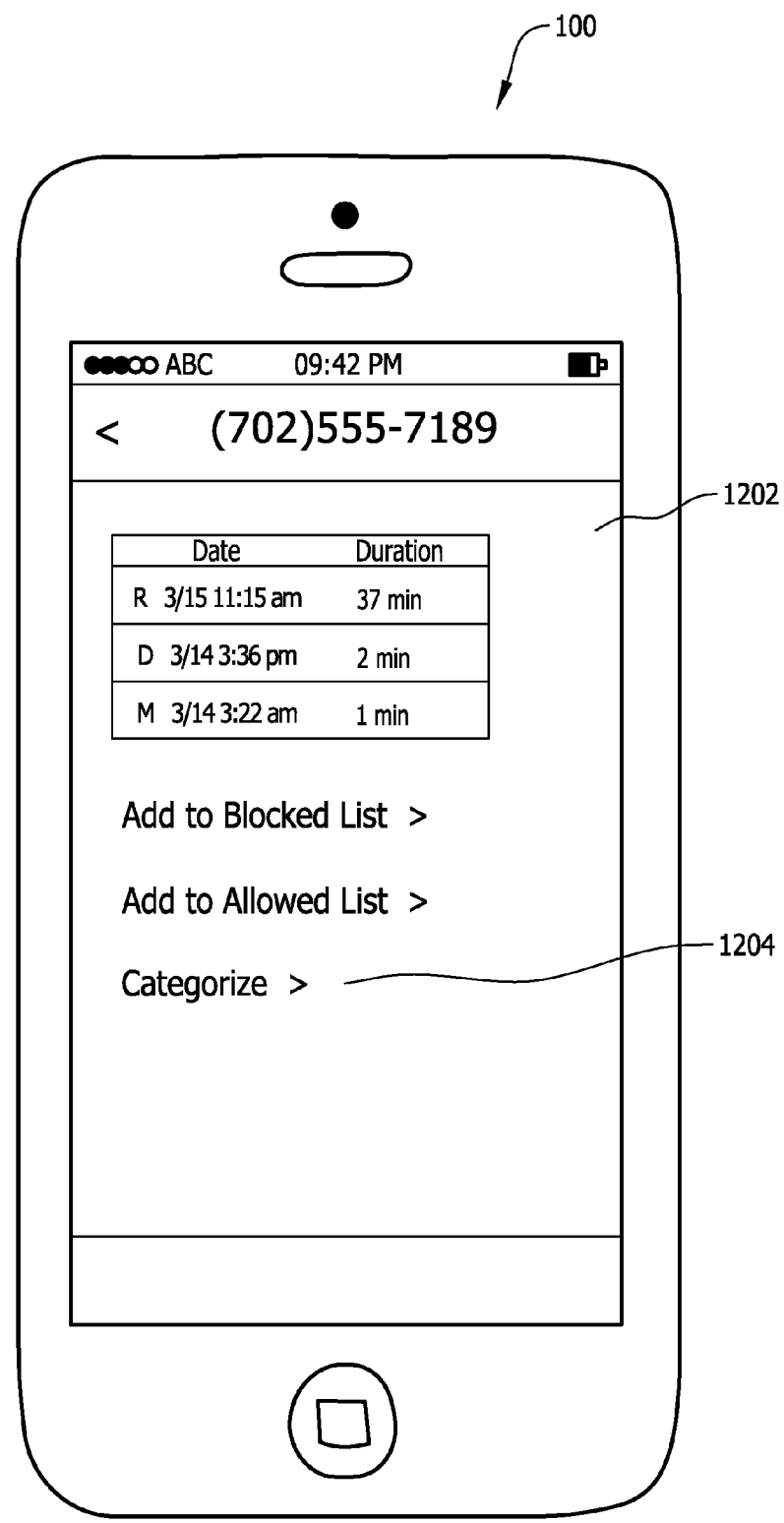

FIG. 12 is a perspective view of user device 100 displaying a screen capture 1202 of a component for managing a new phone number. In the example embodiment, the component includes a "Categorize" button 1204, an "Add to Blocked List" button 1206, and an "Add to Allowed List" button 1208.

Figure 13:
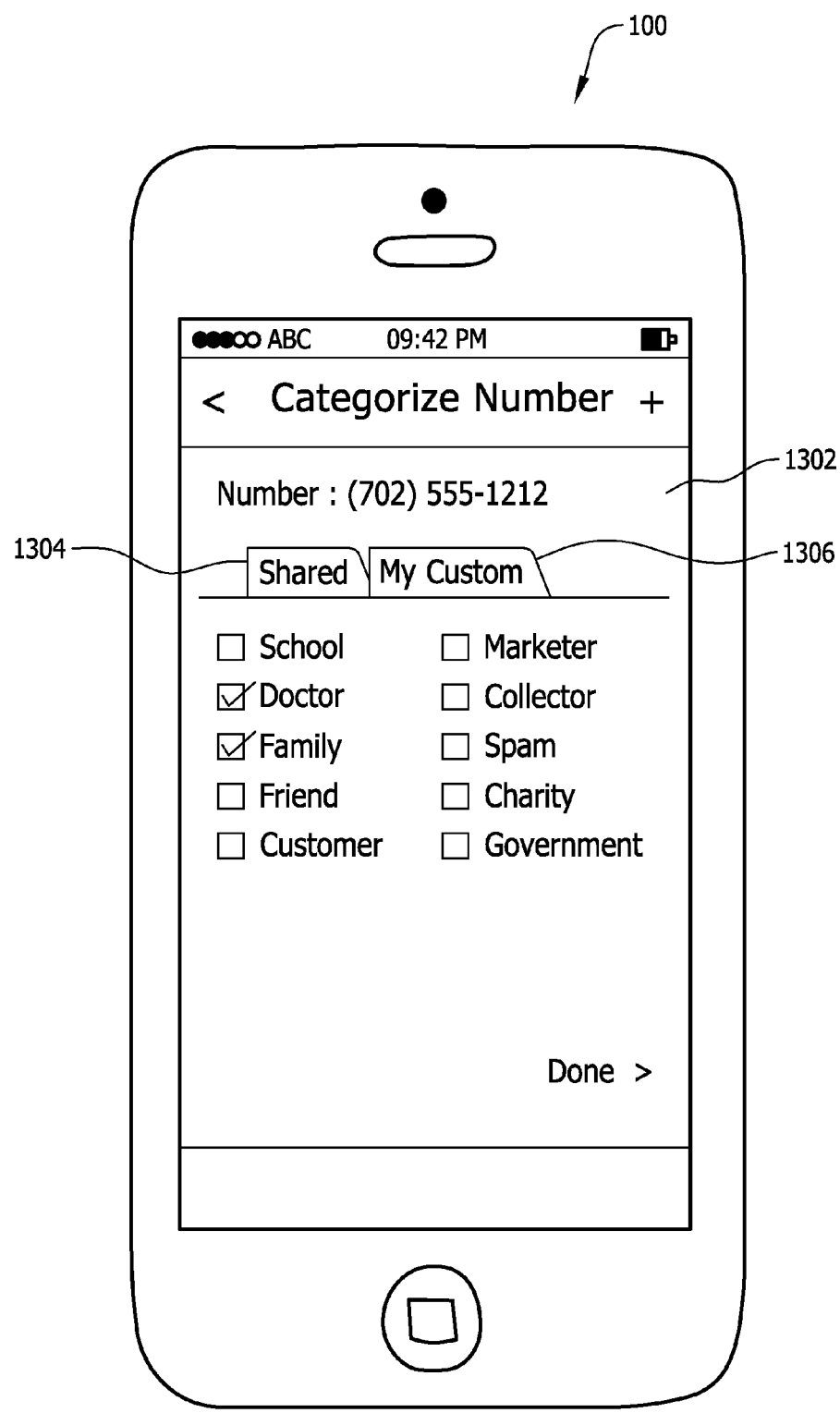

FIG. 13 is a perspective view of user device 100 displaying a screen capture 1302 of a component for adding categories for a new phone number. In the example embodiment, screen capture 1302 is accessed from categorize button 1204 (shown in FIG. 12). Initially, a list of shared categories 1304 is displayed. Additional categories may be added by clicking on a "My Custom" tab 1306.

Figure 14:
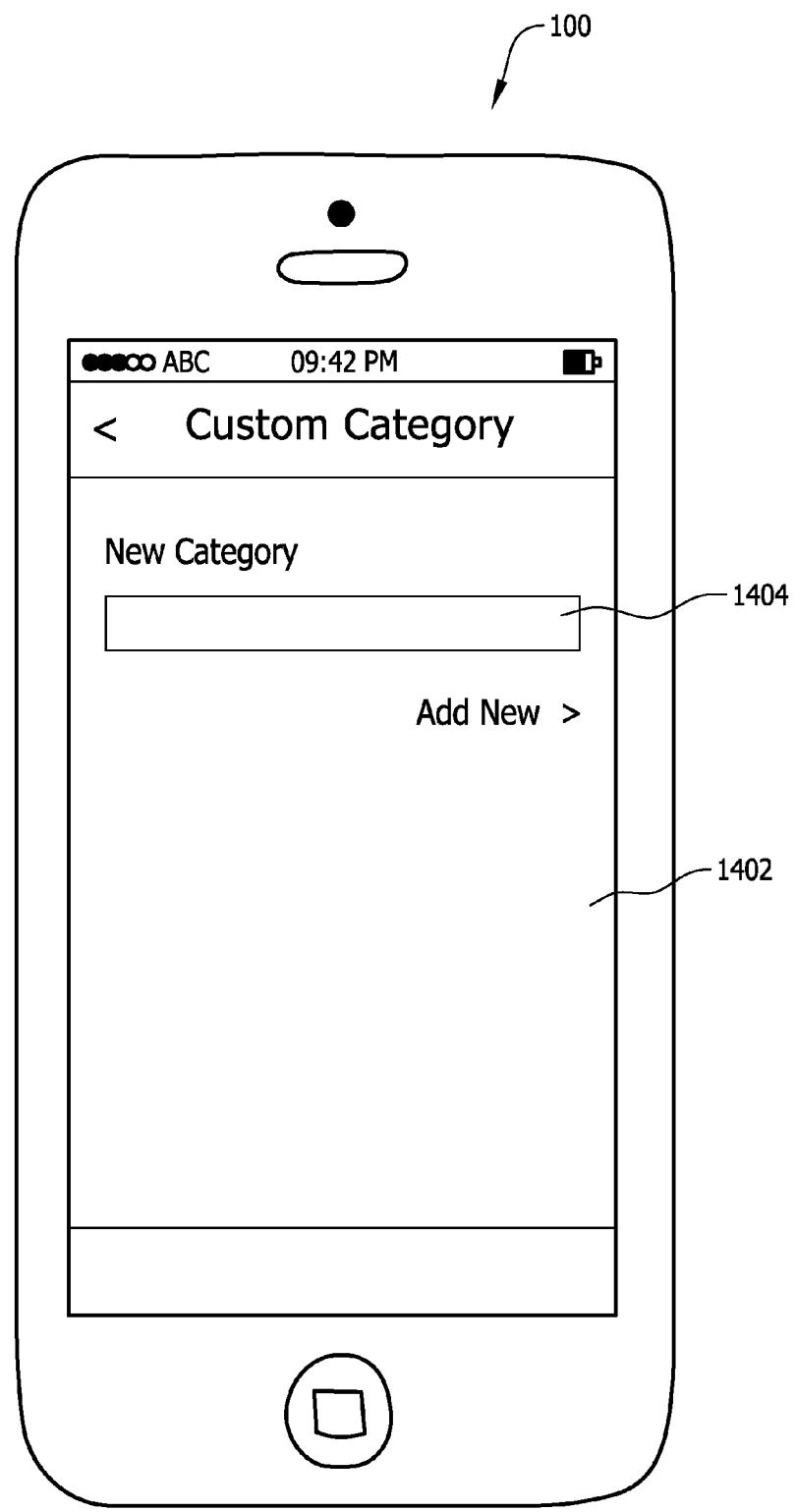

FIG. 14 is a perspective view of user device 100 displaying a screen capture 1402 of a component for adding a new custom category 1404 to the list of shared categories 1304 (shown in FIG. 13).

Figure 15:
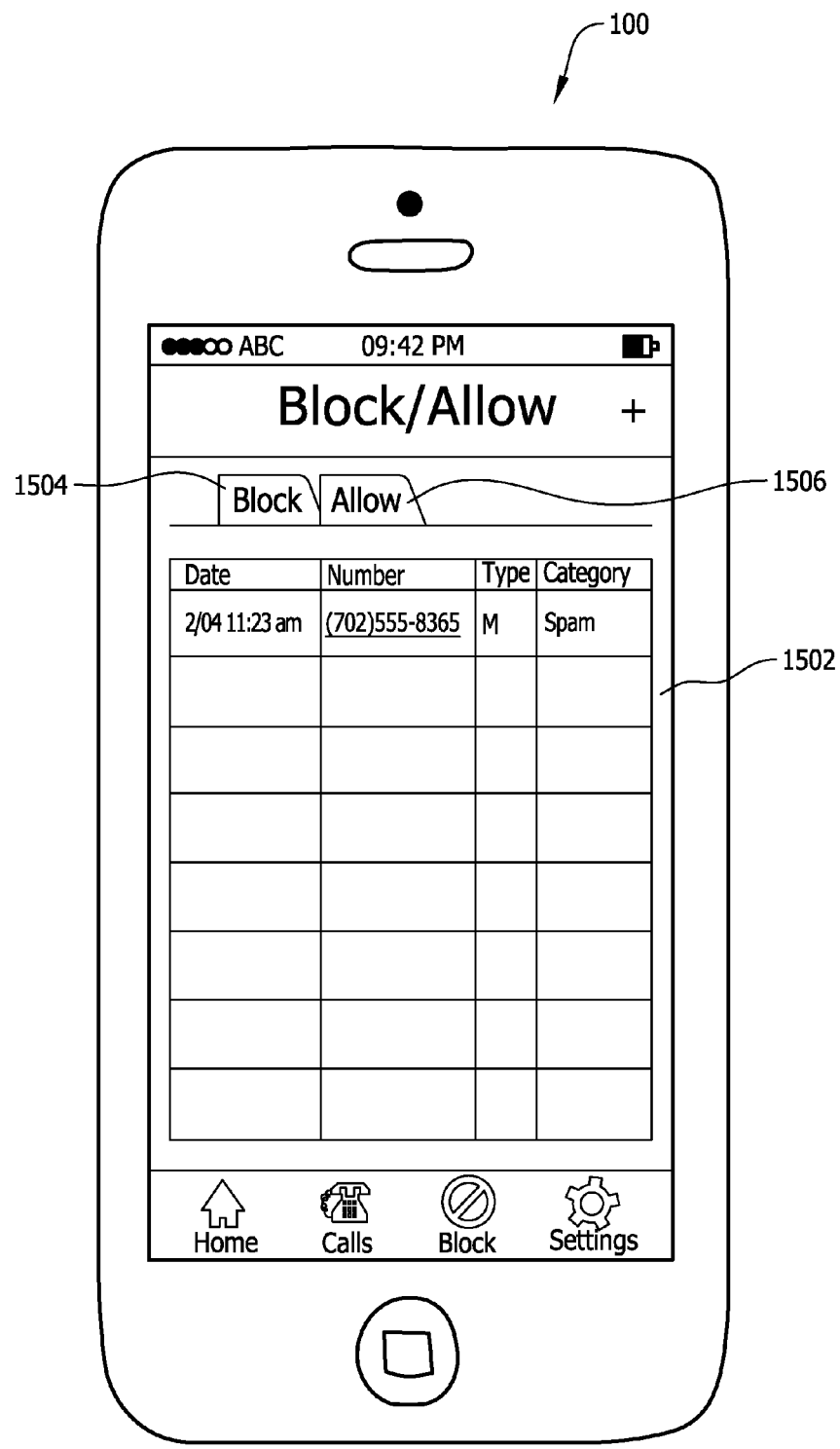

FIG. 15 is a perspective view of user device 100 displaying a screen capture 1502 of a component for blocking and allowing phone numbers that includes a block tab 1504 and an allow tab 1506. Screen capture 1502 may be accessed by clicking on "Add to Blocked List" button 1206, or "Add to Allowed List" button 1208 (both shown in FIG. 12).

Figure 16:
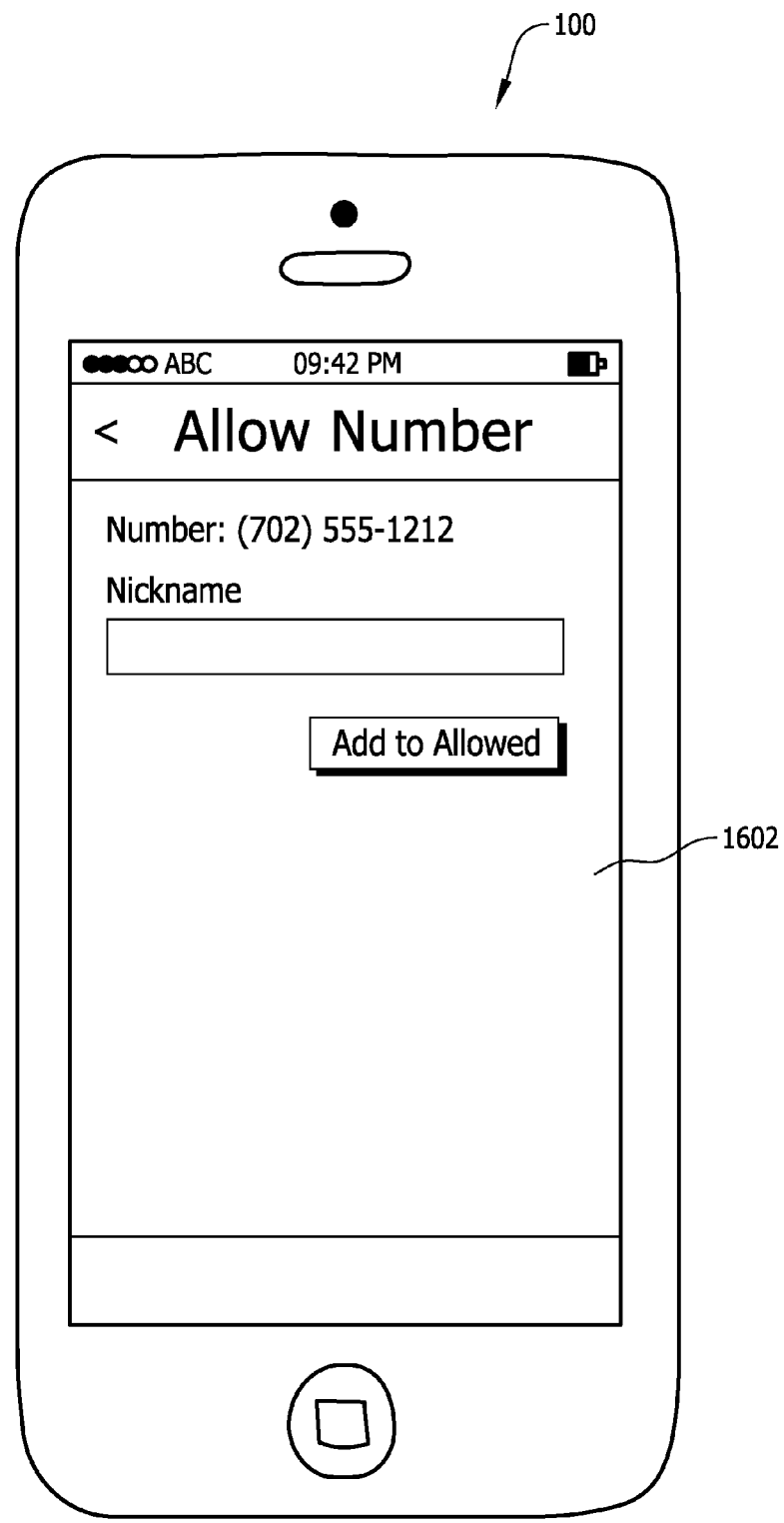

FIG. 16 is a perspective view of user device 100 displaying a screen capture 1602 of an allowed phone number entry screen that is accessed by clicking on allow tab 1506 (shown in FIG. 15).

Figure 17:
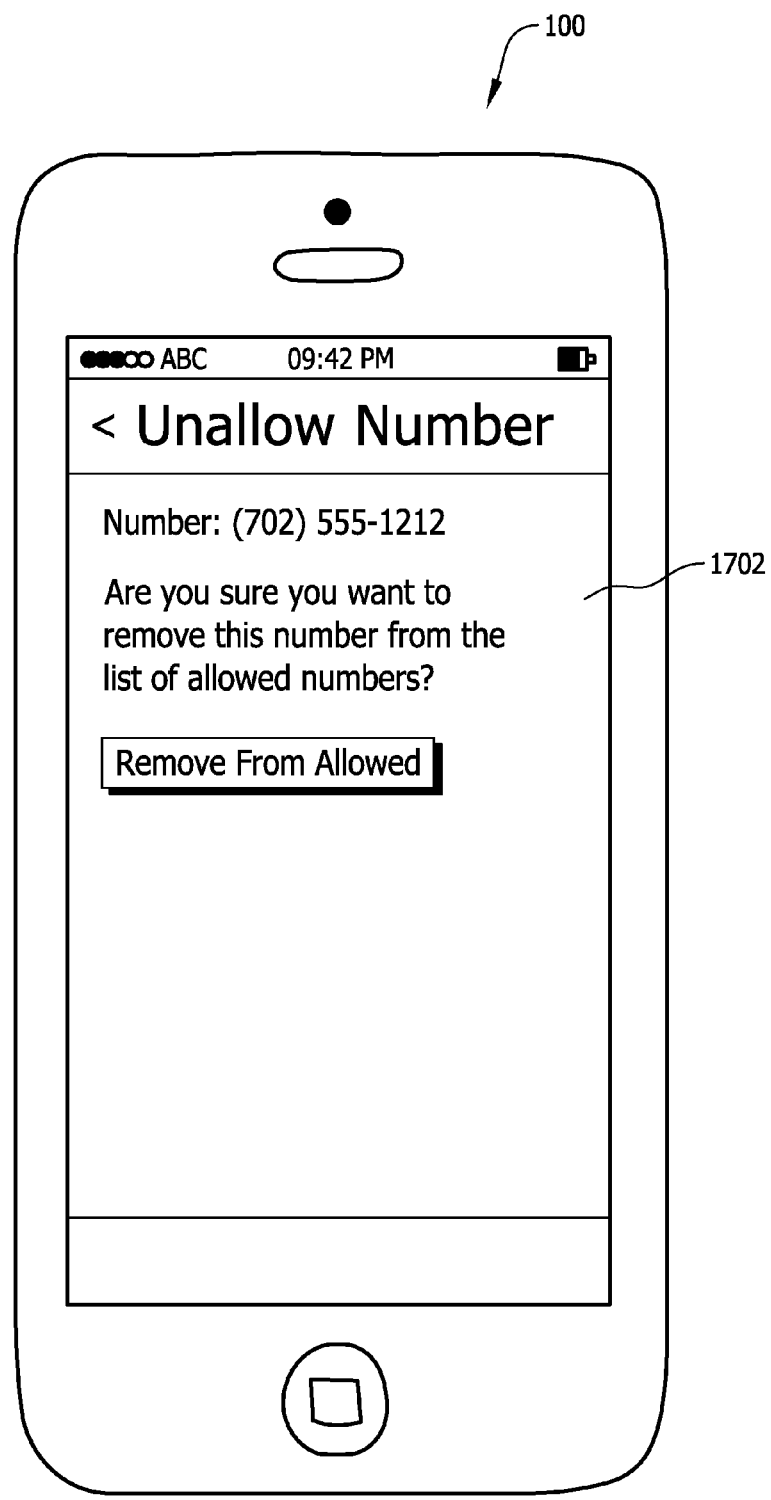

FIG. 17 is a perspective view of user device 100 displaying a screen capture 1702 of a component for unallowing an already allowed phone number.

Figure 18:
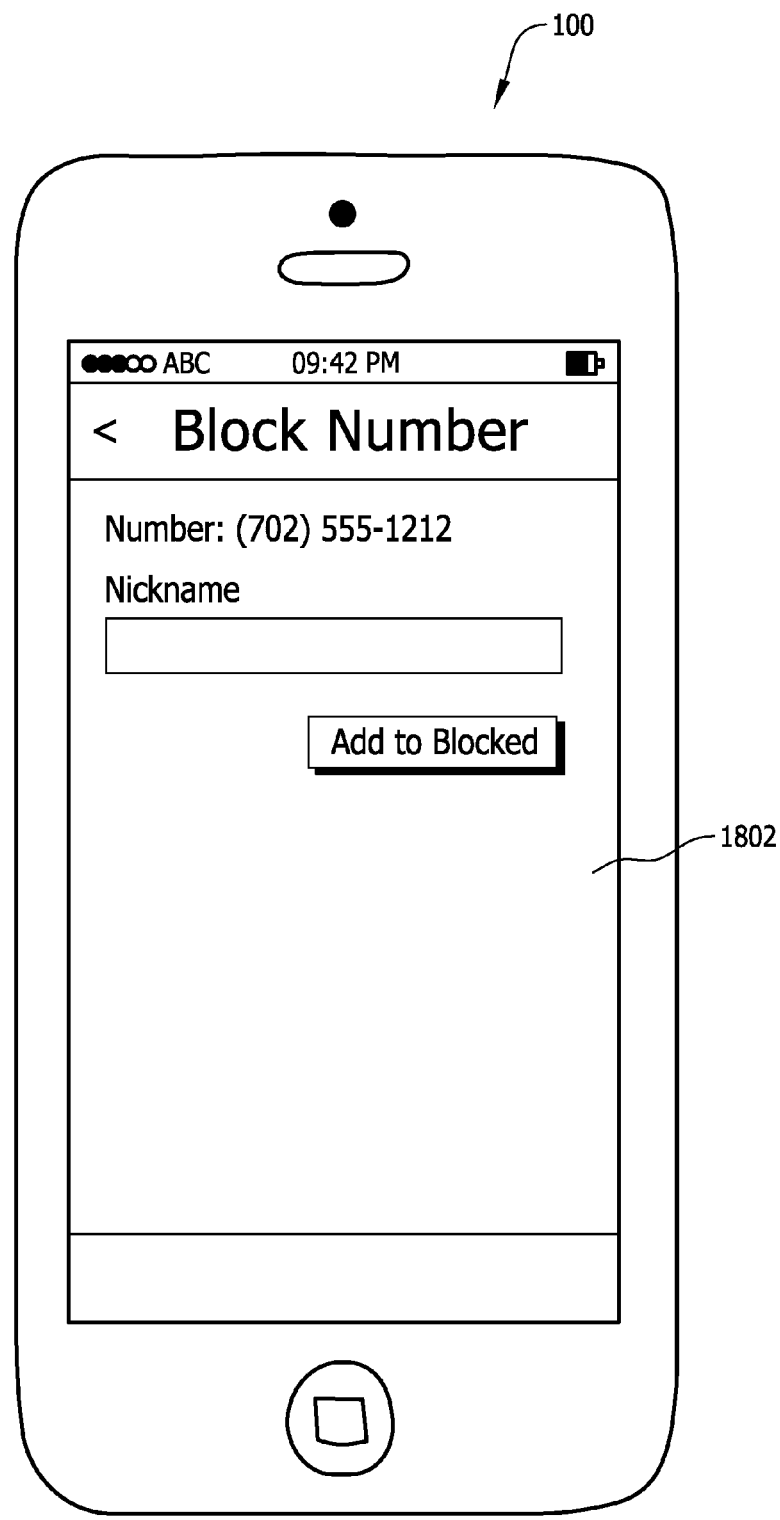

FIG. 18 is a perspective view of user device 100 displaying a screen capture 1802 of a block phone number entry screen that is accessed by clicking on block tab 1504 (shown in FIG. 15).

Figure 19:
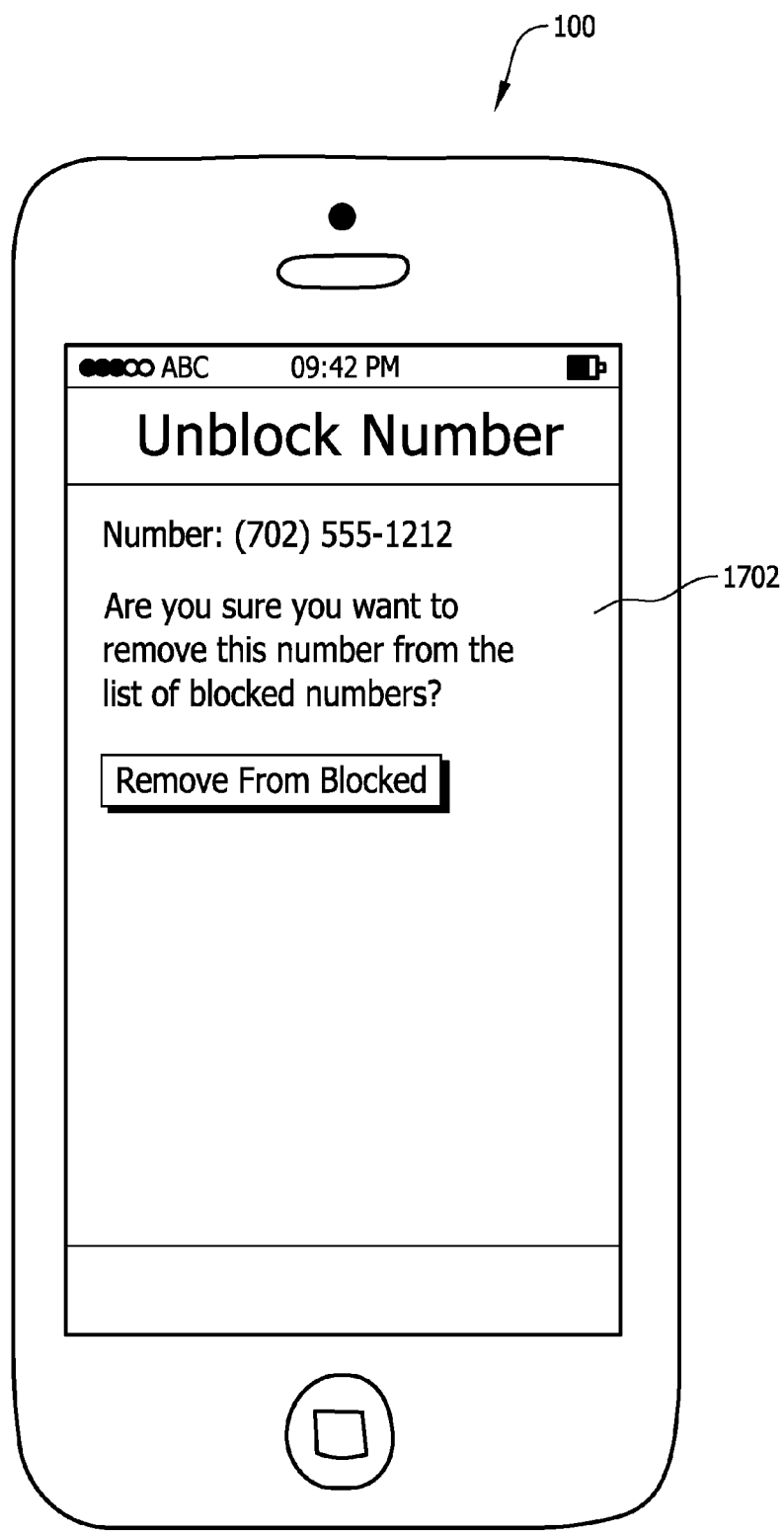

FIG. 19 is a perspective view of user device 100 displaying a screen capture 1902 of a component for unblocking an already blocked phone number.

Figure 20:
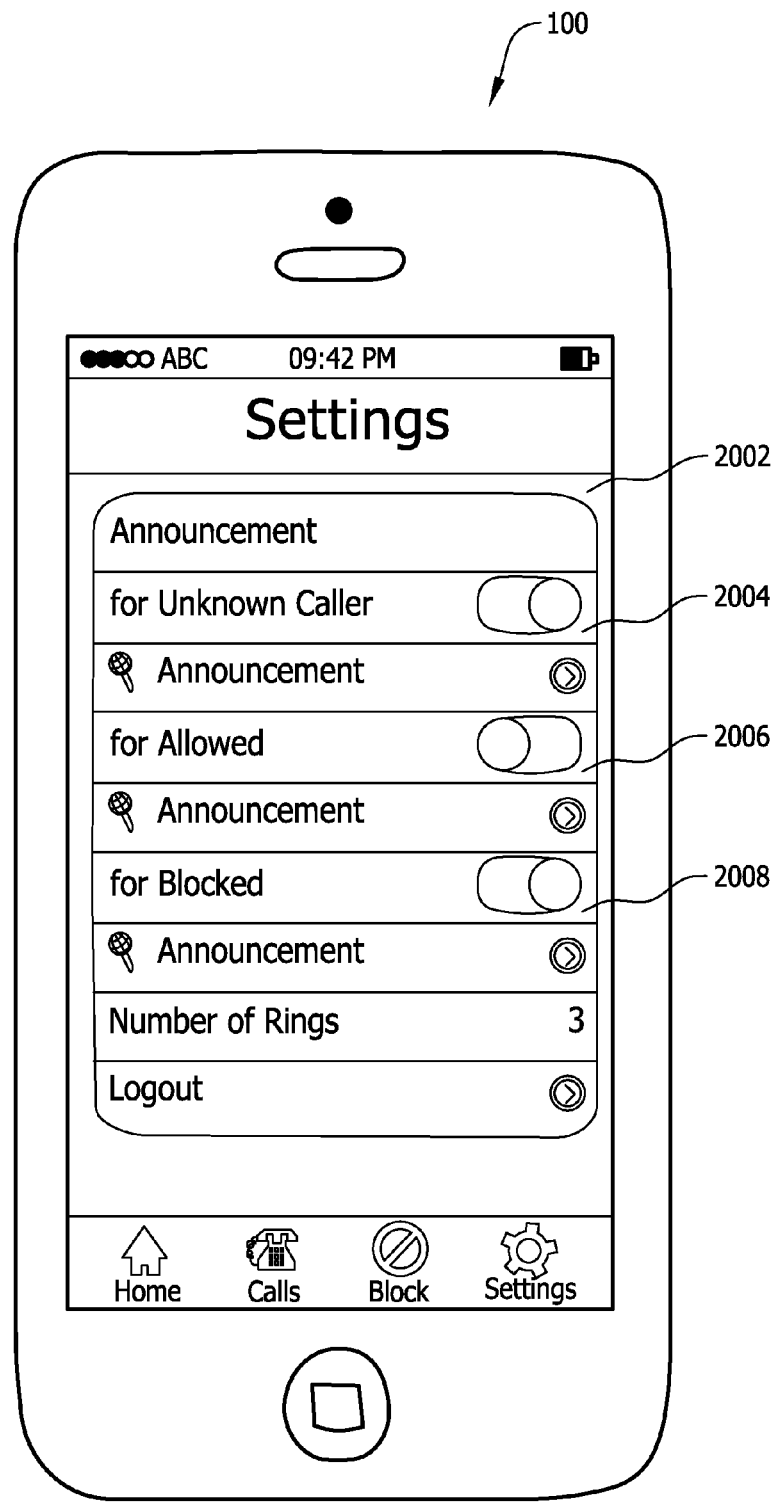

FIG. 20 is a perspective view of user device 100 displaying a screen capture 2002 of a component for managing announcement settings of the application for managing incoming phone calls to user device 100. In the example embodiment, announcements for playing to an unknown caller 2004, to an allowed caller 2006, or to a blocked caller 2008 may be selected.

Figure 21:

FIG. 21 is a perspective view of user device 100 displaying a screen capture 2102 of a component for recording an announcement, for example, an allowed caller. The announcement may be entered textually in a text entry bow 2104 or verbally using a voice recording of the announcement. Entry of announcements for blocked and unknown callers is input similarly.

Figure 22:
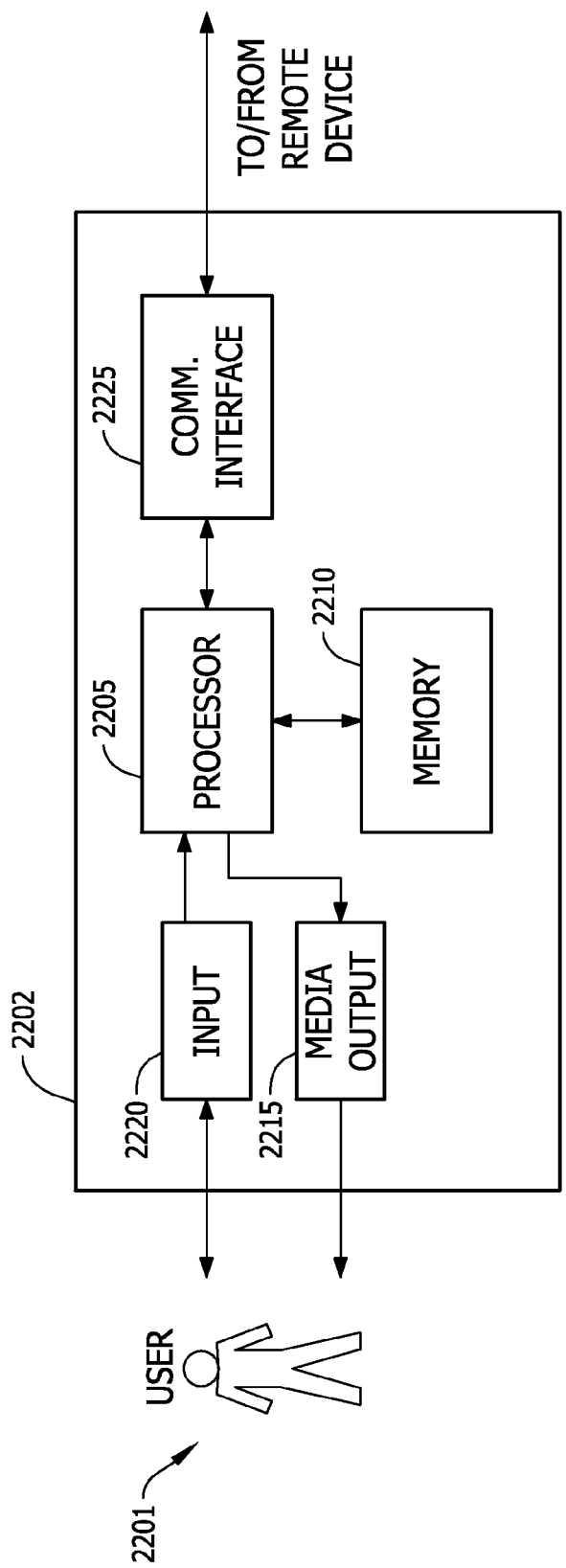

FIG. 22 illustrates an example configuration of user device 100 operated by a user 2201. User device 100 may include, but is not limited to, a client system. In the example embodiment, user device 100 includes a processor 2205 for executing instructions. In some embodiments, executable instructions are stored in a memory area 2210. Processor 2205 may include one or more processing units, for example, a multi-core configuration. Memory area 2210 is any device allowing information such as executable instructions and/or written works to be stored and retrieved. Memory area 2210 may include one or more computer readable media.

User device 100 also includes at least one media output component 2215 for presenting information to user 2201. Media output component 2215 is any component capable of conveying information to user 2201. In some embodiments, media output component 2215 includes an output adapter such as a video adapter and/or an audio adapter. An output adapter is operatively coupled to processor 2205 and operatively couplable to an output device such as a display device, a liquid crystal display (LCD), organic light emitting diode (OLED) display, or "electronic ink" display, or an audio output device, a speaker or headphones.

In some embodiments, user device 100 includes an input device 2220 for receiving input from user 2201. Input device 2220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 2215 and input device 2220. User device 100 may also include a communication interface 2225, which is communicatively couplable to a remote device such as a server system. Communication interface 2225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 2210 are, for example, computer readable instructions for providing a user interface to user 2201 via media output component 2215 and, optionally, receiving and processing input from input device 2220. A user interface may include, among other possibilities, a web browser and client application. Web browsers enable users, such as user 2201, to display and interact with media and other information typically embedded on a web page or a website from the server system. A client application allows user 2201 to interact with a server application from the server system.

Figure 23:
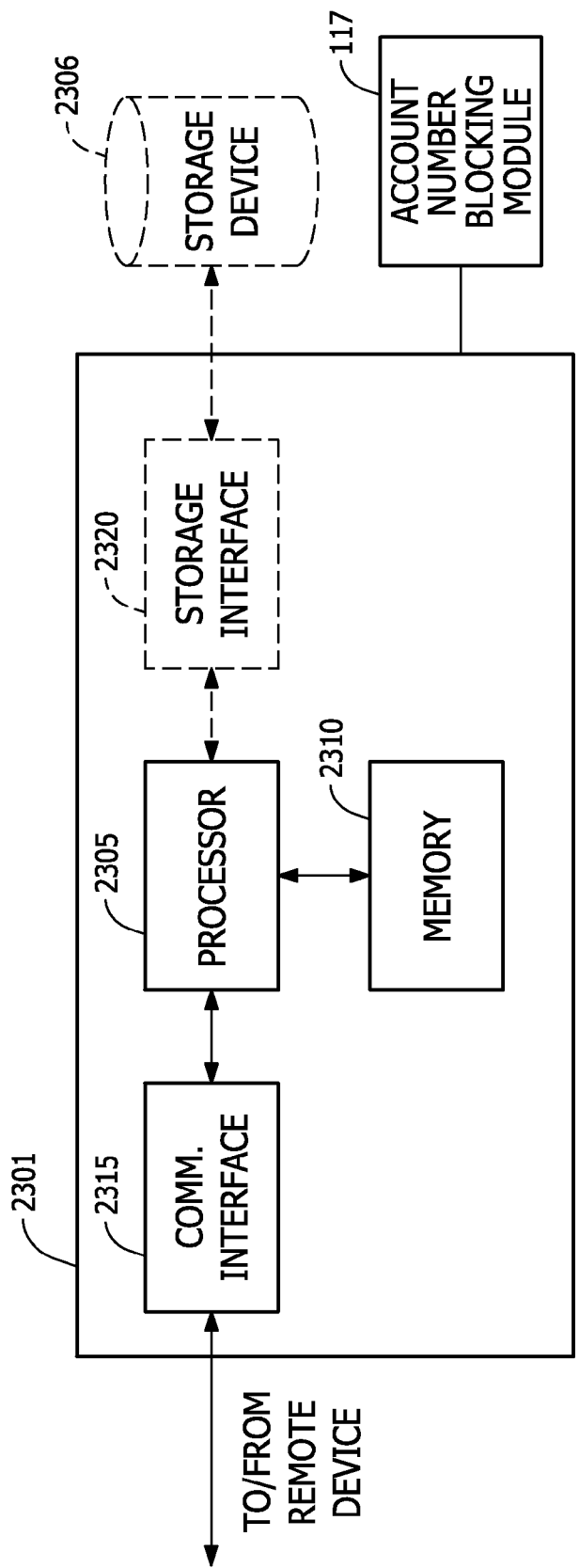

FIG. 23 illustrates an example configuration of a server system 2301 in accordance with an example embodiment of the present disclosure. Server system 2301 may include a database server, a transaction server, a web server, and a directory server.

Server system 2301 includes a processor 2305 for executing instructions. Instructions may be stored in a memory area 2310, for example. Processor 2305 may include one or more processing units (e.g., in a multi-core configuration) for executing instructions. The instructions may be executed within a variety of different operating systems on the server system 2301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 2305 is operatively coupled to a communication interface 2315 such that server system 2301 is capable of communicating with a remote device such as user device 100 or another server system. For example, communication interface 2315 may receive requests from user device 100 via the Internet.

Processor 2305 may also be operatively coupled to a storage device 2306. Storage device 2306 is any computer-operated hardware suitable for storing and/or retrieving data. In some embodiments, storage device 2306 is integrated in server system 2301. For example, server system 2301 may include one or more hard disk drives as storage device 2306. In other embodiments, storage device 2306 is external to server system 2301 and may be accessed by a plurality of server systems 2301. For example, storage device 2306 may include multiple storage units such as hard disks or solid state disks in a redundant array of inexpensive disks (RAID) configuration. Storage device 2306 may include a storage area network (SAN) and/or a network attached storage (NAS) system.

In some embodiments, processor 2305 is operatively coupled to storage device 2306 via a storage interface 2320. Storage interface 2320 is any component capable of providing processor 2305 with access to storage device 2306. Storage interface 2320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 2306.

Memory area 2310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 24:
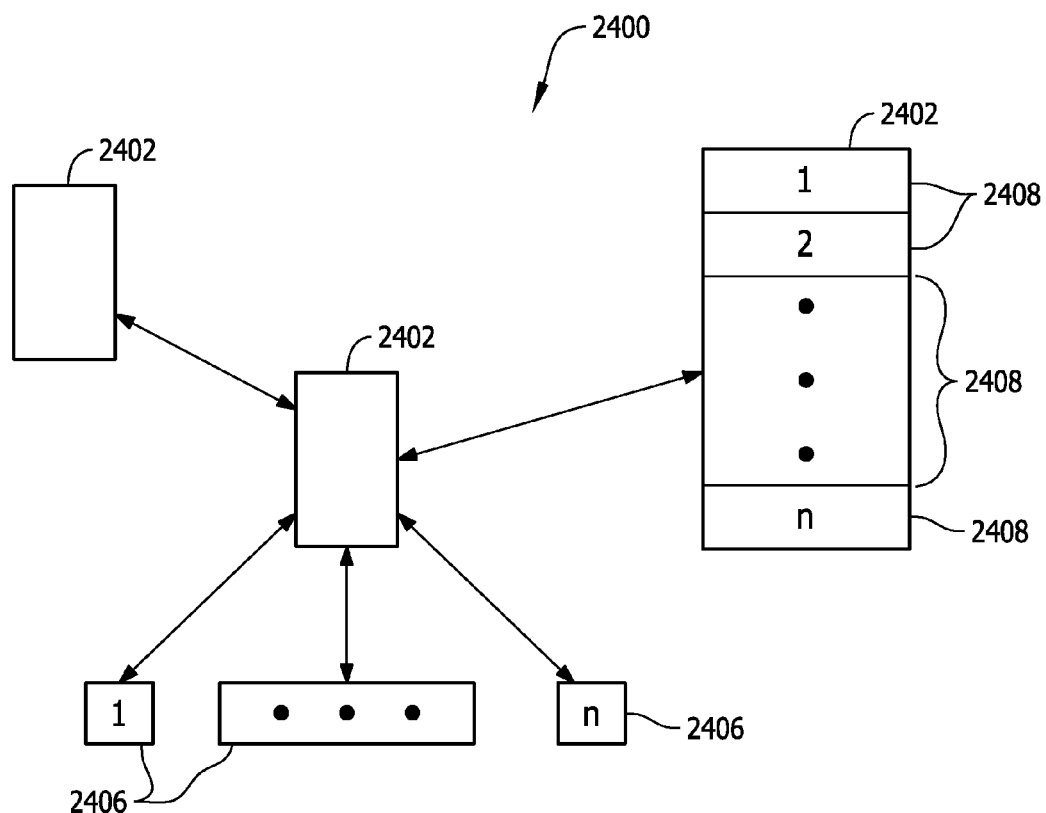
FIG. 24 is a data flow diagram of a telephone front end handler system 2400 in accordance with an example embodiment of the present disclosure.

FIG. 24 is a data flow diagram of a telephone front end handler system 2400 in accordance with an example embodiment of the present disclosure. In the example embodiment, an outside device 2402, which may include user device 100 or other communication device, is in communication with a handler 2404 of telephone front end handler system 2400. Handler 2404 acts as bridge between outside device 2402 and user device 100 to mask the identity of user device 100 to outside device 2402 or other user devices that may be used to attempt to contact outside device 2402 or to attempt to capture the identity of outside device 2402 when user device 100 is used to initiate a phone call. In one embodiment, outside device 2402 is used to initiate a phone call to a phone number associated with an account of telephone front end handler system 2400. Handler 2404 receives the phone call and then initiates phone calls simultaneously to a plurality of phones 2406 based on a plurality of phone numbers 2408 stored in a distribution list 2410. When the first of the plurality of phones 2406 answers the phone call from handler 2404, handler 2404 connects the incoming phone call to the answering phone and disconnects the remainder of the phones that have not answered. For example, if a potential customer calls a phone number associated with a business having an account with telephone front end handler system 2400, handler 2404 then initiates a plurality of phone calls to phone numbers in a salesperson distribution list. When the first of the salespersons answers, handler 2404 connects the salesperson to the potential customer and disconnects the calls to the salespersons that have not yet answered. Thus, the customer is connected quickly to the first available salesperson.

In another embodiment, handler 2404 makes the phone calls to phone numbers 2408 in a "round robin" fashion, meaning, handler 2404 calls phone numbers 2408 sequentially. For example, handler 2404 calls a first of phone numbers 2408 and waits a predetermined period of time for an answer. If no answer is forthcoming, handler disconnects the first of the plurality of phone numbers 2408 and calls a second of the plurality of phone numbers 2408. Handler 2404 continues in this manner until all of the plurality of phone numbers 2408 have been called. Handler 2404 may be programmed to repeat the process starting with the first number again or may be programmed to call a trouble phone number to report that there was no response from plurality of phone numbers 2408 in distribution list 2410.

Figure 25:
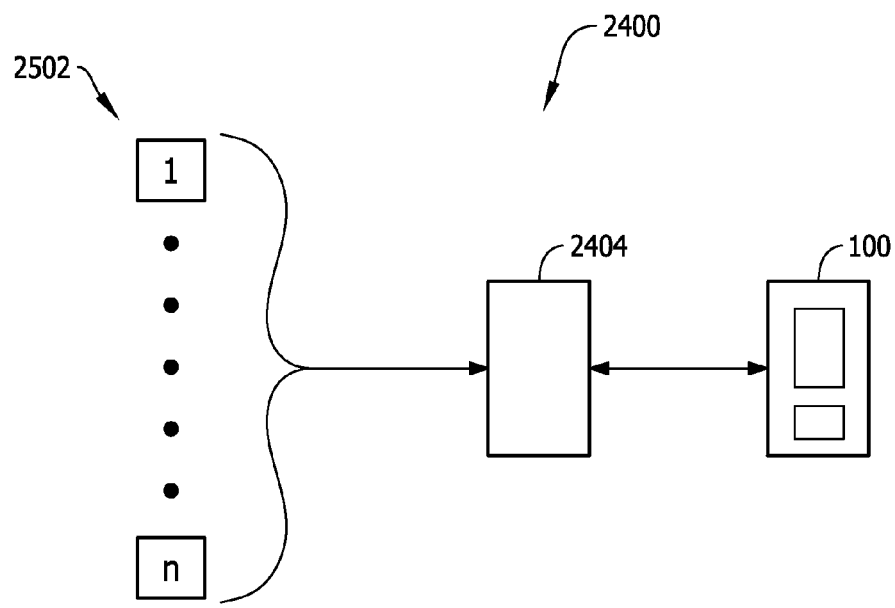
FIG. 25 is a data flow diagram of telephone front end handler system 2400 (shown in FIG. 24) in accordance with another example embodiment of the present disclosure.

FIG. 25 is a data flow diagram of telephone front end handler system 2400 (shown in FIG. 24) in accordance with another example embodiment of the present disclosure. In the example embodiment, a phone call may be received by handler 2404 from any of a plurality of phones 2502. Handler 2404 then applies forwarding rules received and or modified by an account holder of telephone front end handler system 2400. If the phone call meets the logic of the rules, for example, the caller ID indicates the caller is in a known caller category, the phone call is forwarded to user device 100 associated with the account holder. Handler 2404 permits the account holder to maintain an anonymity of the account holder's phone number by using handler 2404 as a communication bridge between callers and user device 100.

In another embodiment, user device 100 can be programmed to greet a caller with an audio message prompting the caller to leave a voice message for the account holder. While the voice message from the caller is being received and recorded, the account holder can also be listening to the message in real-time. If, during the recording and listening period, the account holder wishes to answer the call, the account holder can provide indication of such to user device 100, handler 2404 will connect the caller and user device 100.

During outgoing calls made from user device 100, where the account holder initiates a phone call to any other phone number, user device 100 communicates with handler 2404 to initiate the phone call, handler 2404 selects a phone number from a plurality of available phone numbers reserved to handler 2404 from which to place the phone call. Handler 2404 may also supply a caller ID selected by the account holder. In this way, the account holder can initiate a phone call and still maintain the anonymity of the phone number of user device 100.

Figure 26:
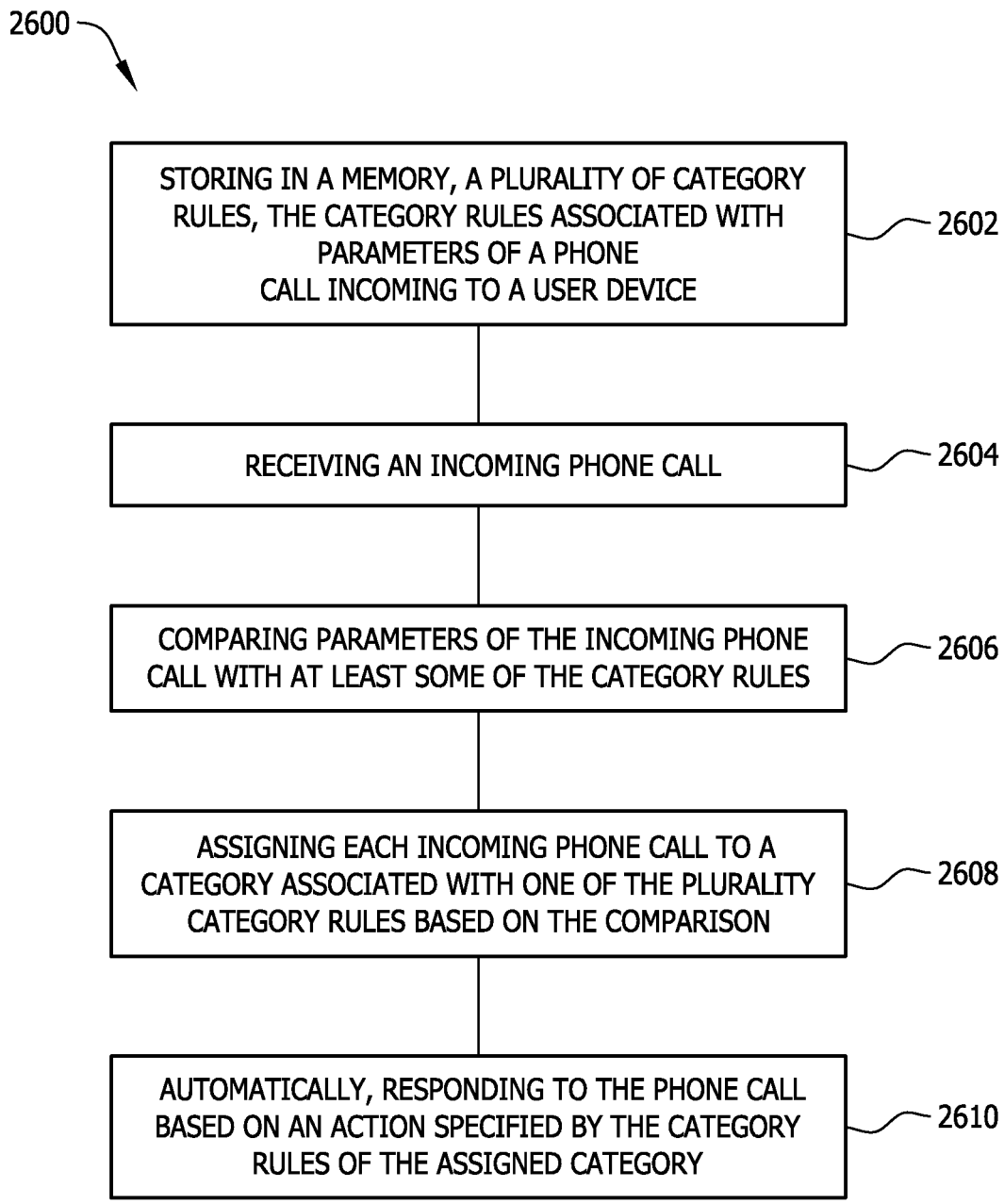
FIG. 26 is a flow chart of a method of managing incoming phone calls to a user device.

FIG. 26 is a flow chart of a method 2600 of managing incoming phone calls to a user device. In the example embodiment, method 2600 includes storing 2602 in a memory, a plurality of category rules, the category rules associated with parameters of a phone call incoming to a user device. Method 2600 also includes receiving 2604 an incoming phone call, comparing 2606 parameters of the incoming phone call with at least some of the category rules, such as, but not limited to a time and date rule. Method 2600 includes assigning 2608 each incoming phone call to a category associated with one of the plurality category rules based on the comparison, and automatically, responding 2610 to the phone call based on an action specified by the category rules of the assigned category. Method 2600 optionally includes receiving an alias phone number from a registered user. Method 2600 further may include comparing a phone number of the caller to a phone number rule. In some embodiments, responding to the phone call includes blocking the phone call based on at least one of a phone number rule and a time and date rule. In one embodiment, blocking the phone call includes providing an audio message to the caller indicating the call is blocked and disconnecting the phone call. In various embodiments, blocking the phone call includes providing an audio message to the caller requesting a personal access number, receiving the personal access number form the caller, verifying the personal access number, and permitting the incoming phone call to ring through to the user device.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 2205 and 2305, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the terms "software" and "firmware" are interchangeable, and include any computer program stored in memory for execution by devices that include, without limitation, mobile devices, clusters, personal computers, workstations, clients, and servers.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "cloud computing" and related terms, e.g., "cloud computing devices" refers to a computer architecture allowing for the use of multiple heterogeneous computing devices for data storage, retrieval, and processing. The heterogeneous computing devices may use a common network or a plurality of networks so that some computing devices are in networked communication with one another over a common network but not all computing devices. In other words, a plurality of networks may be used in order to facilitate the communication between and coordination of all computing devices.

As used herein, the term "mobile computing device" refers to any of computing device which is used in a portable manner including, without limitation, smart phones, personal digital assistants ("PDAs"), computer tablets, hybrid phone/computer tablets ("phablet"), or other similar mobile device capable of functioning in the systems described herein. In some examples, mobile computing devices may include a variety of peripherals and accessories including, without limitation, microphones, speakers, keyboards, touchscreens, gyroscopes, accelerometers, and metrological devices. Also, as used herein, "portable computing device" and "mobile computing device" may be used interchangeably.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The above-described embodiments of a method and system of managing incoming phone calls to a user device provides a cost-effective and reliable means for automatically routing desirable phone calls to the user while efficiently handling unwanted phone calls without interrupting the user. More specifically, the methods and systems described herein facilitate predetermining the desirable phone calls and the unwanted phone calls. In addition, the above-described methods and systems facilitate routing desirable phone calls to the user during certain time periods and efficiently handling the desirable phone calls for later review. As a result, the methods and systems described herein facilitate automatically managing incoming phone calls to a user device in a cost-effective and reliable manner.

This written description uses examples to describe the disclosure, including the best mode, and also to enable any person skilled in the art to practice the disclosure, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for managing incoming phone calls to a user device, said method comprising:
   storing in a memory, a plurality of category rules, the category rules associated with parameters of a phone call incoming to a user device;
   receiving an incoming phone call;
   comparing parameters of the incoming phone call with at least some of the category rules;
   assigning each incoming phone call to a category associated with one of the plurality category rules based on the comparison;
   automatically, responding to the phone call based on an action specified by the category rules of the assigned category;
   providing an audio message to the caller requesting a personal access number when a phone call is blocked based on the action;
   receiving the personal access number form the caller;
   verifying the personal access number; and
   permitting the incoming phone call to ring through to the user device.

2. The method of claim 1, further comprising receiving an alias phone number from a registered user.

3. The method of claim 1, wherein comparing parameters of the incoming phone call with at least some of the category rules comprises comparing a phone number of the caller to a phone number rule.

4. The method of claim 1, wherein comparing parameters of the incoming phone call with at least some of the category rules comprises comparing a current time to a time and date rule.

5. The method of claim 1, wherein blocking the phone call comprises providing an audio message to the caller indicating the call is blocked.

6. The method of claim 1, wherein blocking the phone call comprises disconnecting the phone call.

7. A computer system for processing data, the computer system comprising a non-transitory memory device and a processor in communication with the memory device, the computer system programmed to:
   receive a plurality of phone numbers from a user device;
   store the phone numbers in the memory device, each phone number associated with at least one category rule comprising respective thresholds for one or more phone call parameters;
   receive one or more date and time parameters of when the phone call was received in real-time;
   compare the received date and time parameters to one or more date and time phone call parameters of the date and time category rule associated with the phone number of the incoming phone call;
   block the incoming phone call in accordance with the comparison and
   permit the incoming phone call to ring through to the user device when the caller provides a personal access number.

8. The computer system of claim 7, wherein said computer system is programmed to route the phone call to the user device when at least one phone call parameter indicates the phone number is allowed.

9. The computer system of claim 7, wherein said computer system is programmed to automatically handle the phone call when at least one phone call parameter indicates the phone number is blocked.

10. The computer system of claim 7, wherein said computer system is programmed to automatically handle the phone call when at least one phone call parameter indicates the phone number is unknown.

11. The computer system of claim 7, wherein said computer system is programmed to automatically handle the phone call when the phone number of an incoming call is not associated with at least one category rule.

12. One or more non-transitory computer-readable storage media having computer-executable instructions embodied thereon, wherein when executed by at least one processor, the computer-executable instructions cause the processor to:
   store in a memory, a plurality of category rules, the category rules associated with parameters of a phone call incoming to a user device;
   receive an incoming phone call;
   compare parameters of the incoming phone call with at least some of the category rules;
   assign each incoming phone call to a category associated with one of the plurality category rules based on the comparison;
   automatically, respond to the phone call based on an action specified by the category rules of the assigned category; and provide an audio message to the caller requesting a personal access number;

receive the personal access number form the caller;

verify the personal access number; and permit the incoming phone call to ring through to the user device.

13. The non-transitory computer-readable storage media of claim 11, wherein the computer-executable instructions, when executed by the at least one processor, cause the processor to receive an alias phone number from a registered user.

14. The non-transitory computer-readable storage media of claim 11, wherein the computer-executable instructions, when executed by the at least one processor, cause the processor to compare a phone number of the caller to a phone number rule.

15. The non-transitory computer-readable storage media of claim 11, wherein the computer-executable instructions, when executed by the at least one processor, cause the processor to compare a current time to a time and date rule.

16. The non-transitory computer-readable storage media of claim 11, wherein the computer-executable instructions, when executed by the at least one processor, cause the processor to block the phone call based on at least one of a phone number rule and a time and date rule.

17. The non-transitory computer-readable storage media of claim 11, wherein the computer-executable instructions, when executed by the at least one processor, cause the processor to provide an audio message to the caller indicating the call is blocked.

* * * * *